US012032834B2

(12) United States Patent
Alzheimer et al.

(10) Patent No.: US 12,032,834 B2
(45) Date of Patent: Jul. 9, 2024

(54) MEMORY WITH ADDRESS-SELECTABLE DATA POISONING CIRCUITRY, AND ASSOCIATED SYSTEMS, DEVICES, AND METHODS

(71) Applicant: Micron Technology, Inc., Boise, ID (US)

(72) Inventors: Joshua E. Alzheimer, Boise, ID (US); Mow Yiak Goh, Boise, ID (US); Loren J. Wooley, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 52 days.

(21) Appl. No.: 17/959,131

(22) Filed: Oct. 3, 2022

(65) Prior Publication Data

US 2023/0214130 A1    Jul. 6, 2023

Related U.S. Application Data

(60) Provisional application No. 63/295,064, filed on Dec. 30, 2021.

(51) Int. Cl.
  *G06F 3/06* (2006.01)
  *G06F 11/10* (2006.01)

(52) U.S. Cl.
  CPC .......... *G06F 3/0619* (2013.01); *G06F 3/0629* (2013.01); *G06F 3/0673* (2013.01); *G06F 11/1044* (2013.01)

(58) Field of Classification Search
  CPC .... G06F 3/0619; G06F 3/0629; G06F 3/0673; G06F 11/1044
  See application file for complete search history.

(56) References Cited

U.S. PATENT DOCUMENTS

| | | | | |
|---|---|---|---|---|
| 6,055,204 | A * | 4/2000 | Bosshart | G11C 29/785 365/230.02 |
| 2006/0262616 | A1* | 11/2006 | Chen | G11C 7/22 365/203 |
| 2013/0091329 | A1* | 4/2013 | Sullivan | G11C 29/84 365/207 |
| 2020/0034227 | A1* | 1/2020 | Pawlowski | G11C 16/24 |
| 2020/0034228 | A1* | 1/2020 | Pawlowski | G06F 3/0659 |
| 2020/0210352 | A1* | 7/2020 | Kinsley | G11C 29/52 |

(Continued)

*Primary Examiner* — Matthew M Kim
*Assistant Examiner* — Indranil Chowdhury
(74) *Attorney, Agent, or Firm* — Perkins Coie LLP

(57) ABSTRACT

Memory with address-selectable data poisoning circuitry is disclosed herein. In one embodiment, a memory device comprises circuitry operably connected to a memory array. The circuitry can include memory row address registers and/or memory column address registers. Standard access commands or mode register write commands can be used to load a memory row address or a memory column address into the memory row address registers or the memory column address registers, respectively. During a read operation directed to a second memory row and/or column of the memory array, the circuitry can compare the second memory row to the first memory row and/or the second memory column to the first memory column, and can poison a data bit read from the memory array before the data bit is output from the memory device when the first and second memory row addresses match and/or when the first and second memory column addresses match.

21 Claims, 8 Drawing Sheets

(56) References Cited

U.S. PATENT DOCUMENTS

| | | | | |
|---|---|---|---|---|
| 2021/0064271 | A1* | 3/2021 | Veches | G11C 17/16 |
| 2022/0147267 | A1* | 5/2022 | Rooney | G06F 11/1044 |
| 2022/0149866 | A1* | 5/2022 | Alzheimer | H03M 13/015 |
| 2022/0179736 | A1* | 6/2022 | Sforzin | G06F 11/1016 |
| 2022/0300370 | A1* | 9/2022 | Song | G06F 11/1044 |
| 2022/0326887 | A1* | 10/2022 | Caraccio | G06F 3/0679 |
| 2023/0032668 | A1* | 2/2023 | Kinsley | G06F 11/1004 |
| 2023/0119341 | A1* | 4/2023 | Alzheimer | G06F 11/1076 714/703 |
| 2023/0214130 | A1* | 7/2023 | Alzheimer | G06F 3/064 714/6.21 |
| 2023/0393930 | A1* | 12/2023 | Balluchi | G06F 3/0619 |
| 2024/0004583 | A1* | 1/2024 | Nygren | G06F 3/0619 |

* cited by examiner

MEMORY WITH ADDRESS-SELECTABLE DATA POISONING CIRCUITRY, AND ASSOCIATED SYSTEMS, DEVICES, AND METHODS

CROSS-REFERENCE TO RELATED APPLICATION(S)

The present application claims priority to U.S. Provisional Patent Application No. 63/295,064, filed Dec. 30, 2021, the disclosure of which is incorporated herein by reference in its entirety.

TECHNICAL FIELD

The present disclosure is related to memory systems, devices, and methods. In particular, the present disclosure is related to memory with address-selectable data poisoning circuitry, and associated systems, devices, and methods.

BACKGROUND

Memory devices are widely used to store information related to various electronic devices such as computers, wireless communication devices, cameras, digital displays, and the like. Memory devices are frequently provided as internal, semiconductor, integrated circuits and/or external removable devices in computers or other electronic devices. There are many different types of memory, including volatile and non-volatile memory. Volatile memory, including static random-access memory (SRAM), dynamic random-access memory (DRAM), and synchronous dynamic random-access memory (SDRAM), among others, may require a source of applied power to maintain its data. Non-volatile memory, by contrast, can retain its stored data even when not externally powered. Non-volatile memory is available in a wide variety of technologies, including flash memory (e.g., NAND and NOR) phase change memory (PCM), ferroelectric random-access memory (FeRAM), resistive random-access memory (RRAM), and magnetic random-access memory (MRAM), among others. Improving memory devices, generally, may include increasing memory cell density, increasing read/write speeds or otherwise reducing operational latency, increasing reliability, increasing data retention, reducing power consumption, or reducing manufacturing costs, among other metrics.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments depicted, but are for explanation and understanding only.

DETAILED DESCRIPTION

Figure 1A:
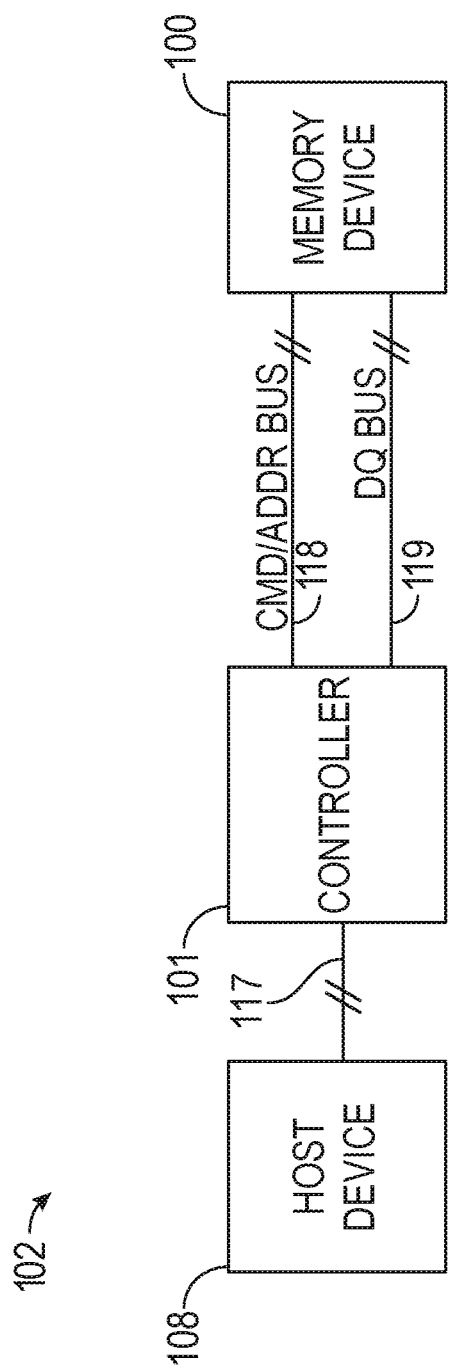
FIG. 1A is a block diagram schematically illustrating a memory system configured in accordance with various embodiments of the present technology.

As discussed in greater detail below, the technology disclosed herein relates to memory with address-selectable data poisoning circuitry, and associated systems, devices, and methods. In some embodiments, a memory device can include circuitry having a plurality of registers that are configured to store user-identified memory row address terms, user-identified memory column address terms, and/or user-identified DQ terminals for data bit poisoning. In operation, the circuitry can be configured to poison (e.g., invert) data bits corresponding to the user-identified memory rows, the user-identified memory columns, and/or the user-identified DQ terminals as those data bits are read from the memory device. Thus, the circuitry can be used to output known bit errors over selected DQ terminals of a memory device that can be used to validate, debug, and/or decode various operations of the memory device and/or a corresponding memory system. A person skilled in the art will understand that the technology may have additional embodiments and that the technology may be practiced without several of the details of the embodiments described below with reference to FIGS. 1A-4.

In the illustrated embodiments below, the memory devices and systems are primarily described in the context of devices incorporating DRAM storage media. Memory devices configured in accordance with other embodiments of the present technology, however, can include other types of memory devices and systems incorporating other types of storage media, including PCM, SRAM, FRAM, RRAM, MRAM, read only memory (ROM), erasable programmable ROM (EPROM), electrically erasable programmable ROM (EEROM), ferroelectric, magnetoresistive, and other storage media, including non-volatile, flash (e.g., NAND and/or NOR) storage media.

A. Overview

Many memory systems are configured to identify and respond to conditions that cause them to exhibit errors or failures. For example, many memory systems employ error correction code (ECC) schemes to identify and/or correct bit errors in data read from memory cells of a memory device. As another example, many memory systems employ post package repair (PPR) operations to replace defective memory rows (e.g., wordlines) with redundant memory rows by remapping logical addresses of the defective memory rows to physical addresses of the redundant memory rows.

Memory systems often execute operations in response to errors while providing very little insight to a user regarding whether the memory systems executed the operations as intended and/or whether the executed operations successfully corrected the errors. For example, when a memory system employs a PPR operation to replace a defective memory row with a redundant memory row or an ECC operation to correct one or more bit errors, the memory system typically executes the PPR operation or the ECC operation without notifying the user (a) that an error was identified; (b) the type, location, and/or other information of the error; (c) that the PPR operation or the ECC operation was executed; (d) that the PPR operation or the ECC operation was appropriately and/or accurately executed; and/or (e) that the PPR operation or the ECC operation successfully corrected the identified error. In other words, users of these memory systems are often unable to validate (i) that the memory systems are accurately identifying failures, (ii) that the memory systems are accurately executing appropriate operations in response to identifying the failures, and/or (iii) that the operations executed by the memory systems are successfully correcting the failures.

As a result, many users request sample memory devices and/or systems from manufacturers with known failures that enable the users to validate various operations of the memory devices and/or systems. In response, manufacturers commonly provide defective memory devices and/or systems having known failures. But such defective memory devices and/or systems represent a small subset of all memory devices and/or systems produced by the manufacturers, and it is relatively expensive for the manufacturers to intentionally produce (i) defective memory devices and/or systems, and/or (ii) memory devices and/or systems that are produced for the sole purpose of validating device/system operations.

To address these concerns, memory devices and/or systems configured in accordance with the present technology can include address-selectable data poisoning circuitry configured to poison user-identified data bits as those data bits are read out from the memory devices. For example, a user can identify (a) a target memory row of a memory array of a memory device or a range of target memory rows of the memory array, (b) a target memory column of the memory array or a range of target memory columns of the memory array, and/or (c) one or more DQ terminals of the memory device from which poisoned data bits can be output. When data bits corresponding to the target memory row(s) and/or to the target memory column(s) are read from the memory array (a) over internal data line corresponding to DQ terminals of the memory device that are enabled to output poisoned data bits and (b) while the address-selectable data poisoning circuitry is enabled, the address-selectable data poisoning circuitry can poison the data bits and output the poisoned data bits via the corresponding DQ terminals of the memory device.

In this manner, memory devices and/or systems configured in accordance with the present technology can generate, using the address-selectable data poisoning circuitry, known bit errors or failures that can be output from the memory devices. In turn, the known bit errors or failures can be used to validate, debug, and/or decode various operations of the memory devices and/or systems, such as ECC operations, PPR operations, and/or system address and/or DQ scrambles. In some embodiments, the address-selectable data poisoning circuitry can be disabled such that the corresponding memory devices and/or systems operate normally (e.g., without poisoning data bits read out from the memory devices). Thus, memory devices and/or systems of the present technology obviate the practice of identifying or intentionally manufacturing defective memory devices with known failures to be provided to users for the purposes of validating, debugging, and/or decoding various operations of the memory devices and/or systems.

B. Selected Embodiments of Memory Systems and Associated Devices and Methods

FIG. 1A is a block diagram schematically illustrating a memory system 102 configured in accordance with various embodiments of the present technology. In one embodiment, the memory system 102 is a dual in-line memory module (DIMM) having one or more memory devices 100 (e.g., one or more DRAM memory devices). Although a single memory device 100 is shown in FIG. 1A, the memory system 102 can include one or more modules or ranks having a plurality of memory devices 100 in some embodiments. Well-known components of the memory system 102 have been omitted from FIG. 1A and are not described in detail below so as to avoid unnecessarily obscuring aspects of the present technology.

The one or more memory devices 100 of the memory system 102 can be connected to an electronic device that is capable of utilizing memory for the temporary or persistent storage of information, or a component thereof. For example, the memory device 100 of FIG. 1A is operably connected to a host device 108. The host device 108 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device 108 may be a networking device (e.g., a switch, a router, etc.); a recorder of digital images, audio, and/or video; a vehicle; an appliance; a toy; or any one of a number of other products. In one embodiment, the host device 108 may be connected directly to the memory device 100 (e.g., via a communications bus of signal traces (not shown)). Additionally, or alternatively, the host device 108 may be indirectly connected to the memory device 100 (e.g., over a networked connection or through intermediary devices, such as through a memory controller 101 and/or via a communications bus 117 of signal traces).

The memory device 100 of the memory system 102 is operably connected to the memory controller 101 via a command/address (CMD/ADDR) bus 118 and a data (DQ) bus 119. As described in greater detail below with respect to FIG. 1B, the CMD/ADDR bus 118 and the DQ bus 119 can be used by the memory controller 101 to communicate commands, memory addresses, and/or data to the memory device 100. In response, the memory device 100 can execute commands received from the memory controller 101. For example, in the event a write command is received from the memory controller 101 over the CMD/ADDR bus 118, the memory device 100 (a) can receive data from the memory controller 101 over the data DQ bus 119, and (b) can write the data to memory cells corresponding to memory addresses received from the memory controller 101 over the CMD/ADDR bus 118. As another example, in the event a read command is received from the memory controller 101 over the CMD/ADDR bus 118, the memory device 100 can output data to the memory controller 101 over the data DQ bus 119 from memory cells corresponding to memory addresses received from the memory controller 101 over the CMD/ADDR bus 118. As also described in greater detail below, the memory controller 101 can include ECC components (not shown) configured to encode and/or decode data sent to or received from the memory device 100 (e.g., to detect and/or correct bit errors included in the data).

Figure 1B:
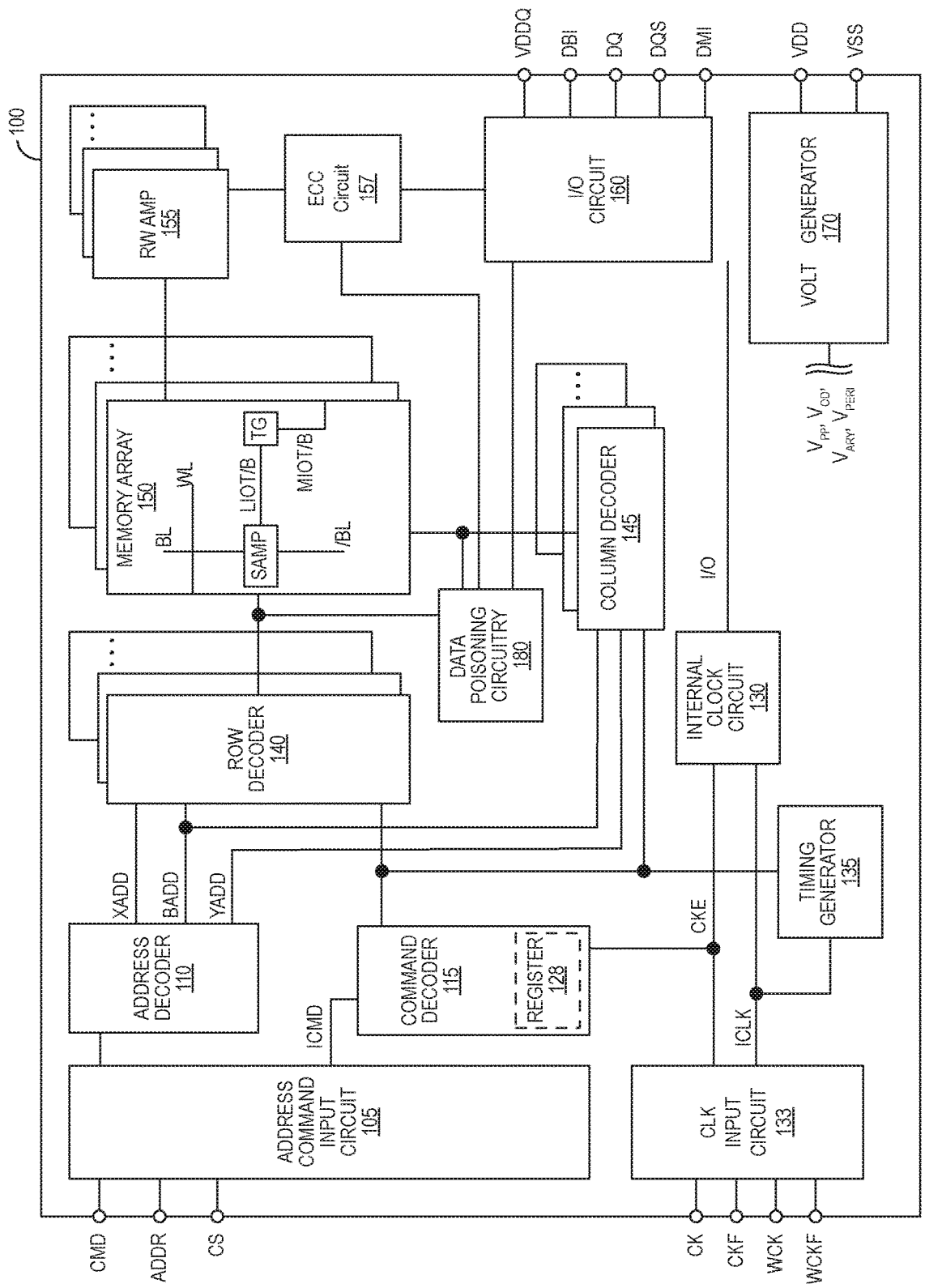
FIG. 1B is a block diagram schematically illustrating a memory device configured in accordance with various embodiments of the present technology.

FIG. 1B is a block diagram of the memory device 100 of FIG. 1A and configured in accordance with various embodiments of the present technology. As shown, the memory device 100 may employ a plurality of external terminals. The external terminals can include command and address terminals operably connected to the CMD/ADDR bus 118 (FIG. 1A) to receive command signals CMD and address signals ADDR, respectively. The external terminals may further include a chip select terminal to receive a chip select signal CS, clock terminals to receive clock signals CK and CKF, data terminals DQ, DQS, DBI, and DMI (e.g., operably connected to the DQ bus 119 of FIG. 1A), and/or power supply terminals VDD, VSS, and VDDQ. The memory device 100 may additionally or alternatively include data clock terminals to receive data clock signals WCK and WCKF, and/or a read data strobe terminal RDQS (not shown). For example, in embodiments in which the memory device 100 is a double data rate (DDR) memory device or a low-power DDR fourth-generation (LPDDR4) memory device, the memory device 100 can include clock terminals CK and CKF to receive a differential clock signal and bidirectional data strobe terminals DQS to transmit and/or receive differential data strobe signals DQS_t and DQS_c. As another example, in embodiments in which the memory device 100 is a graphics DDR (GDDR) or a LPDDR fifth-generation (LPDDR5) memory device, the memory device 100 can include clock terminals CK and CKF to receive command/address clock signals, data clock terminals to receive data clock signals WCK and WCKF, and a unidirectional read data strobe terminal RDQS (e.g., in lieu of the data strobe DQS terminal).

The power supply terminals of the memory device 100 may be supplied with power supply potentials $V_{DD}$ and $V_{SS}$. These power supply potentials $V_{DD}$ and $V_{SS}$ can be supplied to an internal voltage generator circuit 170. The internal voltage generator circuit 170 can generate various internal potentials $V_{PP}$, $V_{OD}$, $V_{ARY}$, $V_{PERI}$, and the like based on the power supply potentials $V_{DD}$ and $V_{SS}$. The internal potential $V_{PP}$ can be used in a row decoder 140, the internal potentials $V_{OD}$ and $V_{ARY}$ can be used in sense amplifiers included in a memory array 150 of the memory device 100, and the internal potential $V_{PERI}$ can be used in many other circuit blocks.

The power supply terminals may also be supplied with power supply potential VDDQ. The power supply potential $V_{DDQ}$ can be supplied to an input/output (I/O) circuit 160 together with the power supply potential $V_{SS}$. The power supply potential $V_{DDQ}$ can be the same potential as the power supply potential $V_{DD}$ in an embodiment of the present technology. The power supply potential $V_{DDQ}$ can be a different potential from the power supply potential $V_{DD}$ in another embodiment of the present technology. However, the dedicated power supply potential $V_{DDQ}$ can be used for the I/O circuit 160 so that power supply noise generated by the I/O circuit 160 does not propagate to the other circuit blocks.

The clock terminals, data clock terminals, and/or the additional clock terminal(s) may be supplied with external clock signals and/or complementary external clock signals. The external clock signals CK, CKF, WCK, and/or WCKF can be supplied to a clock input circuit 133. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

In embodiments in which the memory device 100 includes both clock terminals and data clock terminals, the clock signals CK and CKF received at the clock terminals can have the same or different frequencies as the data clock signals WCK and WCKF received at the data clock terminals. For example, the data clock signals WCK and WCKF can have a frequency greater than (e.g., two times as great, four times as great, etc.) the frequency of the clock signals CK and CKF, respectively, depending on an operating mode of the memory device 100. More specifically, the data clock signals WCK and WCKF (a) can have a frequency twice as great as the frequency of the clock signals CK and CKF, respectively, when the memory device 100 is operating in a low-power operation mode, and (b) can have a frequency four times as great as the frequency of the clocks signals CK and CKF, respectively, when the memory device 100 is operating in a high-speed or high data transfer operation mode. In these and other embodiments, data strobe signals output via the read data strobe terminal RDQS can be generated using or based at least in part on the data clock signals WCK and WCKF. In embodiments in which the memory device 100 does not include the data clock terminals, the data strobe signals output and/or received via the DQS terminals can be generated using or based at least in part on the clock signals CK and CKF.

Input buffers included in the clock input circuit 133 can receive the external clock signals. For example, when enabled by a CKE signal from a command decoder 115, an input buffer can receive the CK and CKF signals and/or the WCK and WCKF signals. The clock input circuit 133 can receive the external clock signals to generate internal clock signals ICLK. The internal clock signals ICLK can be supplied to an internal clock circuit 130. The internal clock circuit 130 can provide various phase and frequency controlled internal clock signals based on the received internal clock signals ICLK and a clock enable signal CKE from the command decoder 115. For example, the internal clock circuit 130 can include a clock path (not shown in FIG. 1B) that receives the internal clock signal ICLK and provides various clock signals (not shown) to the command decoder 115. The internal clock circuit 130 can further provide input/output (I/O) clock signals. The I/O clock signals can be supplied to the I/O circuit 160 and can be used as timing signals to, for example, determine an output timing and/or an input timing of data transmitted over the DQ bus 119 (FIG. 1A). The I/O clock signals can be provided at multiple clock frequencies so that data can be output from and input into the memory device 100 at different data rates. A higher clock frequency may be desirable when high memory speed is desired. A lower clock frequency may be desirable when lower power consumption and/or looser timing margins are desired. The internal clock signals ICLK can also be supplied to a timing generator 135 and thus various internal clock signals can be generated that can be used by the command decoder 115, the column decoder 145, the I/O circuit 160, and/or other components of the memory device 100.

The memory device 100 may include an array of memory cells, such as memory array 150. The memory cells of the memory array 150 may be arranged in a plurality of memory regions, and each memory region may include a plurality of word lines (WL), a plurality of bit lines (BL), and a plurality of memory cells arranged at intersections of the word lines and the bit lines. In some embodiments, a memory region can be one or more memory banks or another arrangement of memory cells (e.g., half memory banks, subarrays in a memory bank, etc.). In these and other embodiments, the memory regions of the memory array 150 can be arranged in one or more groups (e.g., one or more groups of memory banks, one or more logical memory ranks or dies, etc.). Memory cells in the memory array 150 can include any one of a number of different memory media types, including capacitive, magnetoresistive, ferroelectric, phase change, or the like. The selection of a word line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least one respective main I/O line pair (MIOT/B), via transfer gates (TG), which can function as switches. The memory array 150 may also include plate lines and corresponding circuitry for managing their operation.

The command terminals and address terminals may be supplied with an address signal and a bank address signal from outside the memory device 100. The address signal and the bank address signal supplied to the address terminals can be transferred, via a command/address input circuit 105, to an address decoder 110. The address decoder 110 can receive the address signals and supply a decoded row address signal (XADD) to the row decoder 140, and a decoded column address signal (YADD) to the column decoder 145. The address decoder 110 can also receive the address signal and supply a bank address signal (B ADD) to both the row decoder 140 and the column decoder 145.

The command and address terminals can be supplied with command signals CMD, address signals ADDR, and chip selection signals CS (e.g., from the memory controller 101 and/or the host device 108). The command signals may represent various memory commands (e.g., including access commands, which can include read commands and write commands). The select signal CS may be used to select the memory device 100 to respond to commands and addresses provided to the command and address terminals. When an active CS signal is provided to the memory device 100, the commands and addresses can be decoded and memory operations can be performed. The command signals CMD may be provided as internal command signals ICMD to a command decoder 115 via the command/address input circuit 105. The command decoder 115 may include circuits to decode the internal command signals ICMD to generate various internal signals and commands for performing memory operations, for example, a row command signal to select a word line and a column command signal to select a bit line. The internal command signals can also include output and input activation commands, such as clocked command (not shown) to the command decoder 115. The command decoder 115 may further include one or more registers 128 for tracking various counts or values, such as a number of times a memory region (e.g., a memory row) has been activated.

When a read command is issued to a bank with an open memory row (e.g., a memory row opened in response to a preceding activate command) and a column address is timely supplied, read data can be read from memory cells in the memory array 150 designated by the row address and column address. The read command may be received by the command decoder 115, which can provide internal commands to the I/O circuit 160 so that read data can be output from the data terminals DQ, DBI, and DMI via read/write (RW) amplifiers 155 and the I/O circuit 160 according to the read data strobe timing signals output from the memory device 100 via the DQS or RDQS terminals. As a specific example, the memory device 100 can transmit (a) read data strobe timing signal to the memory controller 101 (FIG. 1A) and (b) read data to the memory controller 101 via the DQ terminals of the memory device 100. The read data strobe timing signals can be used as a clock to strobe the read data into the memory controller 101. In other words, the read data strobe timing signals can be used to instruct the memory controller 101 when to sample the read data it receives from the memory device 100.

In some embodiments, the read data may be provided at a time defined by read latency information RL that can be programmed in the memory device 100, for example, in a mode register (not shown in FIG. 1B). The read latency information RL can be defined in terms of clock cycles of the CK clock signal. For example, the read latency information RL can be a number of clock cycles of the CK signal after the read command is received by the memory device 100 when the associated read data is provided.

When a write command is issued to a bank with an open memory row (e.g., a memory row opened in response to a preceding activate command) and a column address is timely supplied, write data can be supplied to the data terminals DQ, DBI, and DMI according to the DQS, WCK, and/or WCKF clock signals. The write command may be received by the command decoder 115, which can provide internal commands to the I/O circuit 160 so that the write data can be received by data receivers in the I/O circuit 160, and supplied via the I/O circuit 160 and the RW amplifiers 155 to the memory array 150. The write data may be written in the memory cell designated by the row address and the column address. In some embodiments, the write data may be provided to the data terminals at a time that is defined by write latency WL information. The write latency WL information can be programmed in the memory device 100, for example, in the mode register (not shown in FIG. 1B). The write latency WL information can be defined in terms of clock cycles of the CK clock signal. For example, the write latency information WL can be a number of clock cycles of the CK signal after the write command is received by the memory device 100 when the associated write data is received.

As a specific example of a write operation, the memory controller 101 (FIG. 1A) can supply (a) an external DQS signal (e.g., a differential write data strobe (WDQS) signal comprising DQS_t and DQS_c) to the DQS terminals of the memory device 100 and (b) write data to the DQ terminals of the memory device 100. The external DQS signal can be used as a clock to strobe the write data into the memory device 100 via the DQ terminals. In other words, the external DQS signal can be used to instruct the memory device 100 when to sample the write data received at the DQ terminals of the memory device 100. In some embodiments, when the memory controller 101 (FIG. 1A) initiates a write operation, the memory controller 101 can begin toggling the external DQS signal during a write preamble period to notify the memory device 100 that the memory controller 101 will soon begin transmitting write data to the DQ terminals of the memory device 100. After the preamble period, the memory controller 101 can supply write data to the DQ terminals of the memory device 100 in accordance with the external DQS signal. In turn, the memory device 100 can latch and register the write data received at the DQ terminals at rising and/or falling edges of an internal DQS signal that is generated based at least in part on the external DQS signal.

As shown, the memory device 100 further includes address-selectable data poisoning circuitry 180 ("circuitry 180"). In the illustrated embodiment, the circuitry 180 is operably connected to the row decoder 140, the column decoder 145, and the I/O circuit 160 of the memory device 100. Thus, the circuitry 180 of FIG. 1B can receive a physical row address from the row decoder 140, a physical column address from the column decoder 145, and/or information (e.g., I/O, burst bits, etc.) from the I/O circuit 160 over the DQ terminals of the memory device 100. In these and other embodiments, the circuitry 180 can output one or more signals to the I/O circuit 160 that cause the I/O circuit 160 to 'poison' (e.g., invert, change, alter, corrupt, etc.) select data bits read out from the memory array 150 during a read operation of the memory device 100.

By configuring the circuitry 180 to receive a physical row address from the row decoder 140, the circuitry 180 can take advantage of redundancy match circuitry (not shown) of the memory device 100 such that the circuitry 180 can be redundancy aware (e.g., aware of any redundant memory rows that have been utilized in PPR operations to replace defective memory rows of the memory array 150). In other embodiments, the circuitry 180 can be configured to receive a logical memory row address (e.g., the row address signal XADD) before the logical memory row address is decoded by the row decoder 140. In such embodiments, the circuitry 180 may not be redundancy aware. In these and other embodiments, the circuitry 180 can be configured to receive a logical memory column address (e.g., the column address signal YADD) before the logical memory column address is decoded by the column decoder 145.

As discussed in greater detail below, the circuitry 180 can include a plurality of registers (FIG. 1C), poison control logic circuitry (FIG. 1D), and datapath poison control logic circuitry (FIG. 1E) that can be used to poison select data bits read out from the memory device 100. More specifically, a memory row address and/or a memory column address can be loaded into one or more registers of the circuitry 180. In turn, the circuitry 180 can, during a read operation of the memory device 100, direct the I/O circuit 160 of the memory device 100 to poison one or more data bits corresponding to the memory row address and/or to the memory column address loaded into the registers of the circuitry 180. In some embodiments, the data poisoning can occur before the data bits are decoded and/or clear an ECC circuit 157 (e.g., an ECC engine or ECC components) of the memory device 100 (e.g., such that ECC operations of the memory device 100 can be validated and/or debugged). The ECC circuit 157 is shown outside of the I/O circuit 160 in FIG. 1B but can be included within the I/O circuit 160 of the memory device 100 in some embodiments or at other locations within the memory device 100 than shown in FIG. 1B. Additionally, or alternatively, the data poisoning can occur after the data bits clear the ECC circuit 157 of the memory device 100 but before the data bits are output from the DQ terminals such that at least one bit error is included in data output from the memory device 100. In other words, the circuitry 180 can be used to generate and/or output known bit errors over user-selected DQ pins and/or in user-selected data bits corresponding to user-selected memory rows and/or user-selected memory columns of the memory array 150. In turn, the known bit errors can be used to validate, debug, and/or decode various operations (e.g., ECC operations, PPR operations, system address scrambles, system DQ scrambles, etc.) of the memory device 100 and/or of the memory system 102.

Figure 1C:
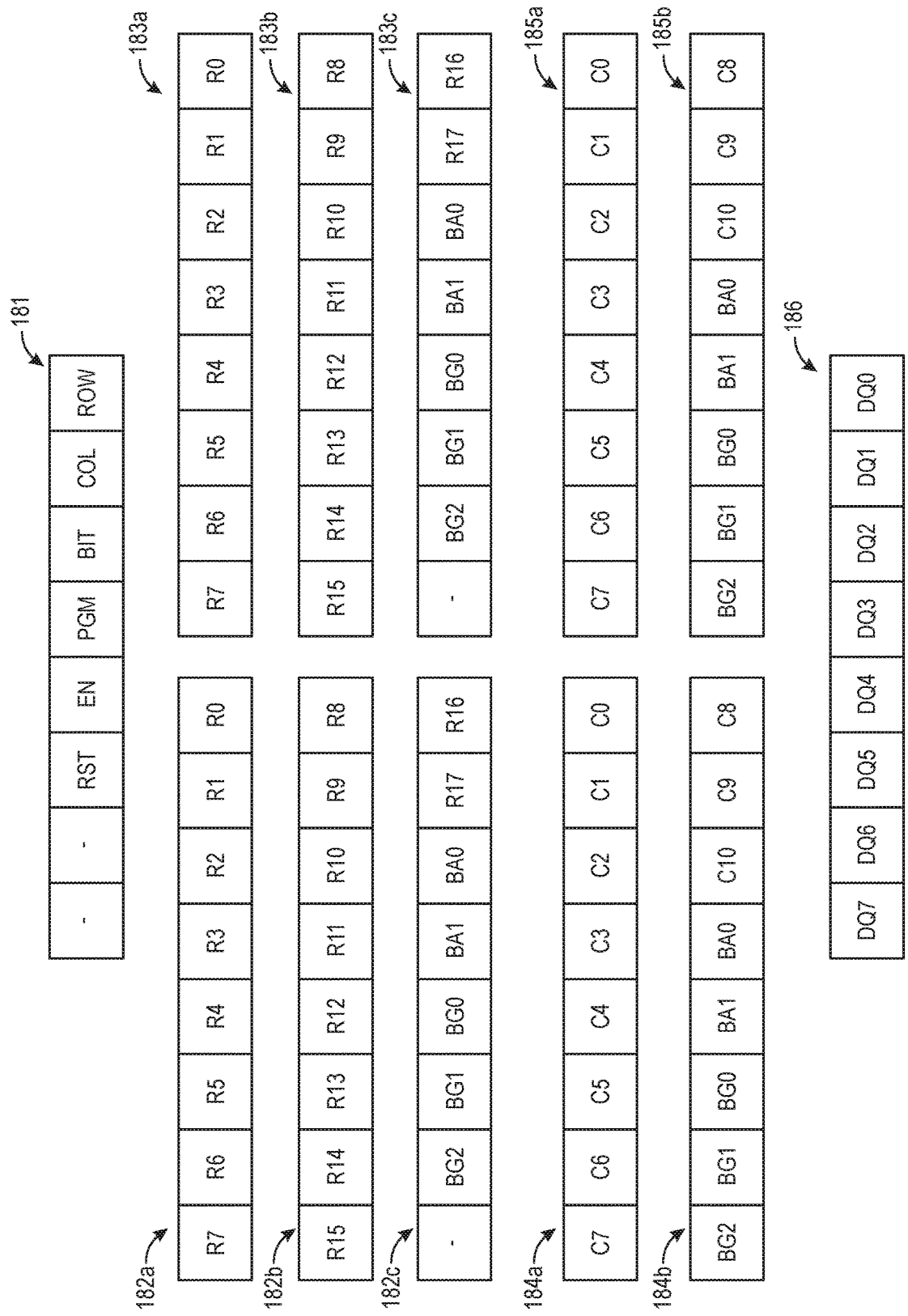
FIG. 1C is a partially schematic representation of various registers that can be included in address-selectable data poisoning circuitry configured in accordance with various embodiments of the present technology.

FIG. 1C is a partially schematic representation of various registers 181-186 that can be included in the circuitry 180 of FIG. 1B. As shown, the circuitry 180 includes a control register 181, memory row address registers 182a-182c ("row address registers 182a-182c"), memory row address mask registers 183a-183c ("row address mask registers 183a-183c"), memory column address registers 184a and 184b ("column address registers 184a and 184b"), memory column address mask registers 185a and 185b ("column address mask registers 185a and 185b"), and an I/O register 186. In some embodiments, the circuitry 180 does not include the row address mask registers 183a-183c, the column address mask registers 185a and 185b, and/or the I/O register 186. Additionally, or alternatively, the circuitry 180 can include one or more other or additional registers than illustrated in FIG. 1C. For example, the circuitry 180 can include one or more additional sets (not shown) of memory row address mask registers and/or one or more additional sets (not shown) of memory column address mask registers (e.g., to facilitate poisoning non-contiguous ranges of memory rows and/or memory columns).

The control register 181 can be used to control operation of the circuitry 180. In some embodiments, the control register 181 is user-programmed, such as via mode register write MRW commands. As shown, the control register 181 includes six utilized bits: (a) a reset RST bit, (b) an enable EN bit, (c) a program PGM bit, (d) a bit BIT bit, (e) a column COL bit, and (f) a row ROW bit. The EN bit of the control register 181 can be used to enable or disable the circuitry 180. For example, when the EN bit is asserted (e.g., written to a "high" or "1" state), the memory device 100 can enter an error generation mode in which the memory device 100 can interact with and/or utilize the circuitry 180 to poison select data bits read out from the memory array 150. On the other hand, when the EN bit is unasserted (e.g., written to a "low" or "0" state), the memory device 100 can operate under normal operation (e.g., the memory device 100 can read data out of the memory array 150 and/or of the memory device 100 without the memory device 100 loading other registers of the circuitry 180 and/or without using the circuitry 180 to poison data bits).

The PGM bit of the control register 181 can be used to enable or disable programming of one or more registers of the circuitry 180 using standard access operations (as described in greater detail below). For example, asserting the PGM bit of the control register 181 can enable programming of the row address registers 182a-182c, of the column address registers 184a and 184b, and/or of the I/O register 186 using standard access operations. In embodiments in which the circuitry 180 includes the row address mask registers 183a-183c and/or the column address mask registers 185a and 185b, asserting the PGM bit can enable programming of the row address mask registers 183a-183c and/or the column address mask registers 185a and 185b using standard access operations. On the other hand, programming of the row address registers 182a-182c, the row address mask registers 183a-183c, the column address registers 184a and 184b, the column address mask registers 185a and 185b, and/or the I/O register 186 can be disabled using standard access operations whenever the PGM bit is not asserted. In some embodiments, the row address registers 182a-182c, the column address registers 184a and 184b, the I/O register 186, the row address mask registers 183a-183c, and/or the column address mask registers 185a and 185b can additionally or alternatively be programmed using MRW commands (e.g., regardless of the state of the PGM bit of the control register 181).

The RST bit of the control register 181 is used to reset one or more registers of the circuitry 180 (e.g., to an all "low" or "0" state, or to another desired state). For example, when the RST bit of the control register 181 is asserted, the circuitry 180 can reset the row address registers 182a-182c and/or the column address registers 184a and 184b. In some embodiments, asserting the RST bit can additionally reset the row address mask registers 183a-183c, the column address mask registers 185a and 185b, and/or the I/O register 186.

The COL bit, the ROW bit, and the BIT bit of the control register 181 are used to specify which data bits are to be poisoned using the circuitry 180 during read operations of the memory device 100. For example, when the COL bit, the ROW bit, and the BIT bit are all asserted, the circuitry 180 can be configured, during a read operation of the memory device 100 directed to a memory row identified in the row address registers 182a-182c and to a memory column identified in the column address registers 184a and 184b, to poison only the data bit corresponding to the intersection of the memory row and the memory column as that data bit is read out from the memory array 150 and before that data bit is output from a DQ terminal of the memory device 100. As another example, when the COL bit and the ROW bit of the control register 181 are asserted but the BIT bit is left unasserted, the circuitry 180 can, during a read operation of the memory device 100 directed to a memory row identified in the row address registers 182a-182c and a memory column identified in the column address registers 184a and 184b, poison (a) each of the data bits corresponding to the memory row and (b) each of the data bits corresponding to the memory column, as those data bits are read out from the memory array 150 and before those data bits are output from one or more DQ terminals of the memory device 100. In other words, asserting the COL bit and the ROW bit of the control register 181 without asserting the BIT bit can result in the circuitry 180 poisoning a cross-like pattern of data bits corresponding to the memory row and memory column loaded into the row address registers 182a-182c and the column address registers 184a and 184b, respectively. As still another example, when only the COL bit of the control register 181 is asserted while the ROW bit and the BIT bit are unasserted, the circuitry 180 (a) effectively ignores the memory row address loaded into the row address registers 182a-182c and (b) poisons, during a read operation of the memory device 100 directed to a memory column identified in the column address registers 184a and 184b, each of the data bits corresponding to the memory column as those data bits are read out from the memory array 150 and before those data bits are output from one or more DQ terminals of the memory device 100. Similarly, when only the ROW bit of the control register 181 is asserted while the COL bit and the BIT bit are unasserted, the circuitry 180 (a) effectively ignores the memory column address loaded into the column address registers 184a and 184b and (b) poisons, during a read operation of the memory device 100 directed to a memory row identified in the row address registers 182a-182c, each of the data bits corresponding to the memory row as those data bits are read out from the memory array 150 and before those data bits are output from one or more DQ terminals of the memory device 100.

In some embodiments, the control register 181 can include additional utilized bits than shown in FIG. 1C. For example, the control register 181 can include a mask bit. When the mask bit is unasserted while the PGM bit is asserted, the circuitry 180 (a) can load a memory row address into the row address registers 182a-182c of the circuitry 180, and/or (b) can load a memory column address into the column address registers 184a and 184b of the circuitry 180. On the other hand, when the mask bit is asserted (e.g., while the PGM bit is unasserted), the circuitry 180 (a) can load a memory row address into the row address mask registers 183a-183c, and/or (b) can load a memory column address into the column address mask registers 185a and 185b. As another example, the control register 181 can include a mask utilize bit. When the mask utilize bit is asserted, the circuitry 180 (a) can utilize memory row address terms loaded into the row address mask registers 183a-183c to mask memory row address terms loaded into the row address registers 182a-182c to define a range of targeted memory rows, and/or (b) can utilize memory column address terms loaded into the column address mask registers 185a and 185b to mask memory column address terms loaded into the column address registers 184a and 184b to define a range of targeted memory columns. On the other hand, when the mask utilize bit is not asserted, the circuitry 180 (a) can ignore memory row address terms loaded into the row address mask registers 183a-183c and utilize only memory row address terms loaded into the row address registers 182a-182c to identify a targeted memory row, and/or (b) can ignore memory column address terms loaded into the column address mask registers 185a and 185b and utilize only memory column address terms loaded into the column address registers 184a and 184b to identify a targeted memory column.

As discussed above, memory row addresses are loaded into the row address registers 182a-182c and/or into the row address mask registers 183a-183c when the PGM bit of the control register 181 is asserted. In embodiments in which the circuitry 180 does not include the row address mask registers 183a-183c, a memory row address loaded into the row address registers 182a-182c identifies a single target memory row for data poisoning during a read operation of the memory device 100, and data poisoning of one or more data bits corresponding to the target memory row is enabled while the EN bit and the ROW bit of the control register 181 are asserted. In embodiments in which the circuitry 180 includes the row address mask registers 183a-183c, the memory row address loaded into the row address registers 182a-182c and the memory row address loaded into the row address mask registers 183a-183c can be used to identify a range of targeted memory rows (discussed in greater detail below with respect to FIG. 2) for data poisoning during a read operation of the memory device 100, and data poisoning of one or more data bits corresponding to memory rows included in the targeted range is enabled while the EN bit and the ROW bit of the control register 181 are asserted.

As shown, each memory row address loaded into the row address registers 182a-182c is a collection of 23 bits that identify a specific memory row in a specific memory bank and a specific memory bank group of the memory array 150. Memory row addresses loaded into the row address mask registers 183a-183c can include a similar number and structure of bits. In some embodiments in which the row address registers 182a-182c and/or the row address mask registers 183a-183c are programmed using (e.g., only) standard access operations of the memory device 100 (as described in greater detail below), the memory row addresses loaded into the row address registers 182a-182c and/or into the row address mask registers 183a-183c can omit the memory bank address and/or the memory bank group because the standard access operations can be repeated per memory bank across the memory array 150.

Memory row addresses of other embodiments of the present technology can include a different number and/or structure of bits. For example, the unutilized bit in the row address register 182c and/or the row address mask register 183c can be used to specify whether the address loaded into the row address registers 182a-182c and/or into the row address mask registers 183a-183c (a) corresponds to defective memory row of the memory array 150 and/or (b) is an address of a redundant memory row of the memory array 150 that is being utilized to replace a defective memory row. Such a redundant identifier bit can be used by the circuitry 180 to ensure that appropriate bits of data are poisoned when the data is read out from a redundant memory row (e.g., as opposed to a user-selected defective memory row) of the memory array 150 during a read operation of the memory device 100.

As discussed above, memory column addresses are loaded into the column address registers 184a and 184b and/or into the column address mask registers 185a and 185b. In embodiments in which the circuitry 180 does not include the column address mask registers 185a and 185b, a memory column address loaded into the column address registers 184a and 184b identifies a single target memory column for data poisoning during a read operation of the memory device 100, and data poisoning of one or more data bits corresponding to the target memory column is enabled while the EN bit and the COL bit of the control register 181 are asserted. In embodiments in which the circuitry 180 includes the column address mask registers 185a and 185b, the memory column address loaded into the column address registers 184a and 184b and the memory column address loaded into the column address mask registers 185a and 185b can be used to identify a range of targeted memory columns (discussed in greater detail below with respect to FIG. 2) for data poisoning during a read operation of the memory device 100, and data poisoning of one or more data bits corresponding to memory columns included in the targeted range is enabled while the EN bit and the COL bit of the control register 181 are asserted.

As shown, each memory column address loaded into the column address registers 184a and 184b is a collection of 16 bits that identify a specific memory column in a specific memory bank and a specific memory bank group of the memory array 150. Memory column addresses loaded into the column address mask registers 185a and 185b can include a similar number and structure of bits. In some embodiments in which the column address registers 184a and 184b and/or the column address mask registers 185a and 185b are programmed using (e.g., only) standard access operations of the memory device 100 (as described in greater detail below), the memory column addresses loaded into the column address registers 184a and 184b and/or into the column address mask registers 185a and 185b can omit the memory bank address and/or the memory bank group because the standard access operations can be repeated per memory bank across the memory array 150. In other embodiments of the present technology, memory column addresses can include a different number and/or structure of bits than shown in FIG. 1C.

As discussed above, memory row addresses can be loaded into the row address registers 182a-182c and/or into the row address mask registers 183a-183c using standard access operations of the memory device 100. For example, the memory device 100 can receive a memory row address and an activate ACT command (e.g., from the memory controller 101 and/or the host device 108 of FIG. 1A). Assuming that the EN bit and the PGM bit of the control register 181 are asserted, the circuitry 180 can execute an ACT operation (e.g., a dummy ACT operation) and load the received memory row address (or a physical memory row address output from the row decoder 140 (FIG. 1B) that corresponds the received memory row address) into the row address registers 182a-182c.

Similarly, memory column addresses can be loaded into the column address registers 184a and 184b and/or into the column address mask registers 185a and 185b using standard access operations of the memory device 100. For example, the memory device 100 can receive a memory column address and a write WR command or a write-auto-precharge WR-AP command (e.g., from the memory controller 101 and/or the host device 108). Assuming that the EN bit and the PGM bit of the control register 181 are asserted, the circuitry 180 can execute a WR operation and/or a WR-AP operation (e.g., a dummy WR operation and/or a dummy WR-AP operation) and load the received memory column address (or a physical memory column address output from the column decoder 145 (FIG. 1B) that corresponds to the received memory column address) into the column address registers 184a and 184b.

In embodiments in which the circuitry 180 includes the row address mask registers 183a-183c, the circuitry 180 can be configured to load the row address mask registers 183a-183c with a memory row address upon receipt of a second or another ACT command. In some embodiments, a one-bit counter (or a bit of the control register 181) can be used to track whether to load the row address registers 182a-182c or to load the row address mask registers 183a-183c upon receipt of an ACT command. Similarly, in embodiments in which the circuitry 180 includes the column address mask registers 185a and 185b, the circuitry 180 can be configured to load the column address mask registers 185a and 185b upon receipt of a second or another WR command or WR-AP command. A one-bit counter (or a bit of the control register 181) can be used to track whether to load the column address registers 184a and 184b or to load the column address mask registers 185a and 185b upon receipt of a WR command or a WR-AP command.

Additionally, or alternatively, a memory row address can be written directly to the row address registers 182a-182c and/or to the row address mask registers 183a-183c using MRW commands of the memory device 100. In these and other embodiments, a memory column address can be written directly to the column address registers 184a and 184b and/or to the column address mask registers 185a and 185b using mode register write MRW commands of the memory device 100. MRW commands can be particularly useful when using the circuitry 180 to decode address scrambles and/or DQ scrambles of the memory system 102 (FIG. 1A).

The I/O register 186 of the circuitry 180 can be used to specify internal data lines (e.g., data read/write DRW lines) of the memory device 100 on which to poison data bits. In some embodiments, the I/O register 186 is user-programmed. For example, the I/O register 186 can be programmed using information transmitted to the memory device 100 over the DQ bus 119 of FIG. 1A or another data bus. More specifically, the memory controller 101 and/or the host device 108 (FIG. 1A) can provide the memory device 100 information over the DQ bus 119 to use in programming the I/O register 186 when (a) the memory controller 101 provides a WR or WR-AP command and a memory column address to the memory device 100 (e.g., via the CMD/ADDR bus 118 of FIG. 1A), and (b) the EN bit and the PGM bit of the control register 181 are asserted. Additionally, or alternatively, the I/O register 186 can be programmed directly via MRW commands.

As shown, the I/O register 186 includes eight bits corresponding to eight DQ terminals DQ0-DQ7 of the memory device 100. The I/O register 186 can include a different number of bits and/or the circuitry 180 can include multiple I/O registers 186 in other embodiments in which the memory device 100 includes a different number of DQ terminals. In some embodiments, when a bit of the I/O register 186 is unasserted, the circuitry 180 is disabled from poisoning a data bit read out of the memory device 100 on internal data lines corresponding to the respective DQ terminal of the memory device 100. In these and other embodiments, when a bit of the I/O register 186 is asserted, the circuitry 180 is enabled to poison a data bit read out of the memory device 100 on internal data lines corresponding to the respective DQ terminal (e.g., assuming that the data bit corresponds (a) to the memory row address loaded into the row address registers 182a-182c, (b) to a range of memory row addresses defined by the row address registers 182a-182c and the row address mask registers 183a-183c, (c) to the memory column address loaded into the column address registers 184a and 184b, and/or (d) to a range of memory column addresses defined by the column address registers 184a and 184b and the column address mask registers 185a and 185b).

A user can utilize the I/O register 186 of the circuitry 180 to select from which memory device 100 of a memory system 102 to read out poisoned data bits. For example, the controller 101 of the memory system 102 can be configured to transmit command/address signals to each of the memory devices 100 of the memory system 102 such that the memory devices 100 share the command/address signals. In these embodiments, one or more of the memory devices 100 can be entirely disabled from reading out poisoned data bits by programming the corresponding I/O registers 186 of the one or more memory devices 100 such that all bits of the I/O registers 186 are unasserted. On the other hand, one or more memory devices 100 of the memory system 102 can be enabled to read out poisoned data bits by programming the corresponding I/O registers 186 of the one or more memory devices 100 such that one or more bits of the I/O registers 186 are asserted. In other words, the I/O registers 186 of the memory devices 100 can enable a user to specify (a) from which memory device(s) 100 of a memory system 102 poisoned data bits will be read and (b) over which DQ terminals of each of those memory devices 100.

Figure 1D:
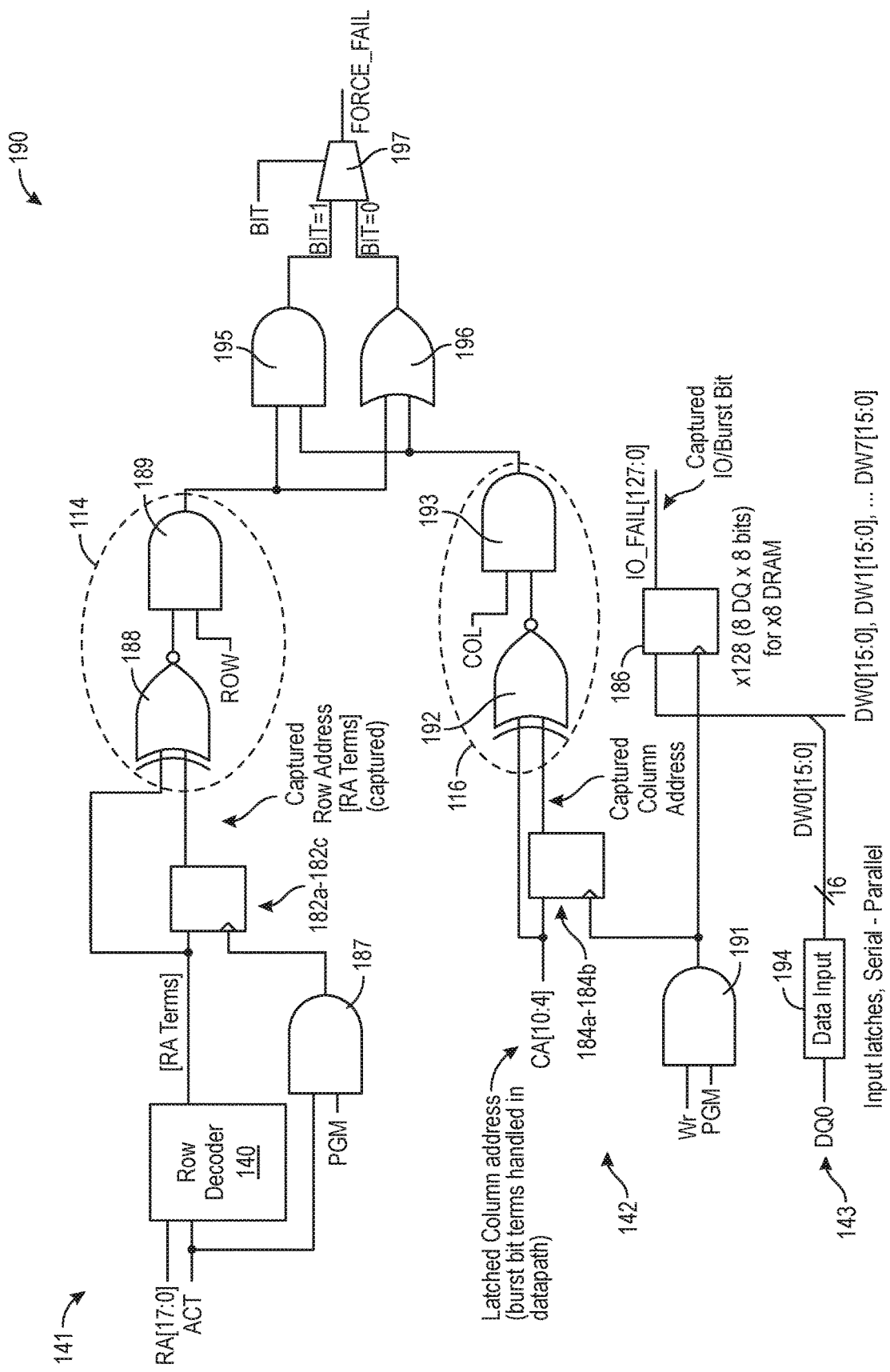
FIG. 1D is a partially schematic representation of poison control logic circuitry of address-selectable data poisoning circuitry configured in accordance with various embodiments of the present technology.

FIG. 1D is a partially schematic representation of poison control logic circuitry 190 ("logic circuitry 190") of the circuitry 180 and configured in accordance with various embodiments of the present technology. As shown, the logic circuitry 190 includes three primary branches: a first branch 141 corresponding to handling of the memory row address information, a second branch 142 corresponding to handling of the memory column address information, and a third branch 143 corresponding to handling of DQ information. The row address mask registers 183a-183c and the column address mask registers 185a and 185b have been omitted from FIG. 1D for the sake of clarity and understanding, but are discussed in greater detail below with respect to FIG. 2. A person of ordinary skill in the art will readily appreciate that the logic circuitry 190 illustrated in FIG. 1D can be a simplified circuit diagram of one or more other, more complex circuits that provide the same or similar functions but that include additional or alternative circuit components or arrangements than shown in FIG. 1D. Such other circuits are within the scope of the present technology.

Referring to the first branch 141 of the logic circuitry 190 illustrated in FIG. 1D, the first branch 141 includes the row address registers 182a-182c, an AND gate 187, an XNOR gate 188, and an AND gate 189. The AND gate 187 is configured to produce the logical product or logical conjunction of an ACT command and the PGM bit of the control register 181 (FIG. 1C). The output of the AND gate 187 is fed as a clock signal into the row address registers 182a-182c. Thus, when the PGM bit of the control register 181 is asserted and the memory device 100 receives an ACT command, the output of the AND gate 187 clocks memory row address terms output from the row decoder 140 of the memory device 100 into the row address registers 182a-182c. These memory row address terms are then fed from the row address registers 182a-182c into a first input of the XNOR gate 188. After the row address registers 182a-182c are loaded with the memory row address terms from the row decoder 140, the PGM bit of the control register 181 can be unasserted such that the row address registers 182a-182c are disabled from being updated with newly incoming memory row address terms upon receipt of a subsequent ACT command.

In some embodiments, the first branch 141 of the logic circuitry 190 can additionally include an OR gate (not shown) having a first input connected to the output of the AND gate 187, a second input that is fed an MRW command, and an output connected to the row address registers 182a-182c (e.g., as opposed to having the output of the AND gate 187 connected directly to the row address registers 182a-182c). In this manner, an MRW command can be used to load memory row address terms into the row address registers 182a-182c (e.g., regardless of the state of the PGM bit).

The XNOR gate 188 of the first branch 141 determines when the memory row address terms loaded into the row address registers 182a-182c match newly incoming memory row address terms output from the row decoder 140 (e.g., upon receipt of a subsequent ACT command). When the memory row address terms loaded into the row address registers 182a-182c match newly incoming memory row address terms output from the row decoder 140 while the PGM bit is unasserted (e.g., signifying a read operation of the memory device 100 directed to the memory row identified by the memory row address terms loaded into the row address registers 182a-182c), the XNOR gate 188 outputs a logical high value to the AND gate 189. In turn, the AND gate 189 outputs the logical product or logical conjunction of the output of the XNOR gate 188 and the ROW bit of the control register 181. The output of the AND gate 189 is fed into an AND gate 195 and an OR gate 196 of the logic circuitry 190, each of which are discussed in greater detail below.

Referring now to the second branch 142 of the logic circuitry 190, the second branch 142 includes the column address registers 184a and 184b, an AND gate 191, an XNOR gate 192, and an AND gate 193. The second branch 142 operates similar to the first branch 141. In particular, the AND gate 191 is configured to produce the logical product or logical conjunction of a WR or WR-AP command and the PGM bit of the control register 181 (FIG. 1C). The output of the AND gate 191 is fed as a clock signal into the column address registers 184a and 184b. Thus, when the PGM bit of the control register 181 is asserted and the memory device 100 receives an WR or WR-AP command, the output of the AND gate 191 clocks memory column address terms (e.g., output from the column decoder 145 (FIG. 1B) of the memory device 100) into the column address registers 184a and 184b. These memory column address terms are then fed from the column address registers 184a and 184b into a first input of the XNOR gate 192. After the column address registers 184a and 184b are loaded with the memory column address terms, the PGM bit of the control register 181 can be unasserted such that the column address registers 184a and 184b are disabled from being updated with newly incoming memory column address terms upon receipt of a subsequent WR or WR-AP command.

In some embodiments, the second branch 142 of the logic circuitry 190 can additionally include an OR gate (not shown) having a first input connected to the output of the AND gate 191, a second input that is fed an MRW command, and an output connected to the column address registers 184a and 184b (e.g., as opposed to having the output of the AND gate 191 connected directly to the column address registers 184a and 184b). In this manner, an MRW command can be used to load memory column address terms into the column address registers 184a and 184b (e.g., regardless of the state of the PGM bit).

The XNOR gate 192 of the second branch 142 determines when the memory column address terms loaded into the column address registers 184a and 184b match newly incoming memory column address terms (e.g., upon receipt of a subsequent WR or WR-AP command). When the memory column address terms loaded into the column address registers 184a and 184b match newly incoming memory column address terms while the PGM bit is unasserted (e.g., signifying a read operation of the memory device 100 directed to the memory column identified by the memory column address terms loaded into the column address registers 184a and 184b), the XNOR gate 192 outputs a logical high value into the AND gate 193. In turn, the AND gate 193 outputs the logical product or logical conjunction of the output of the XNOR gate 192 and the COL bit of the control register 181. The output of the AND gate 193 is fed into the AND gate 195 and the OR gate 196 of the logic circuitry 190.

The AND gate 195 of the logic circuitry 190 produces the logical product or logical conjunction of the output of the AND gate 189 of the first branch 141 and the output of the AND gate 193 of the second branch 142. Thus, the output of the AND gate 195 is high only when (a) the memory row address terms loaded into the row address registers 182a-182c match newly incoming memory row address terms, (b) the ROW bit of the control register 181 (FIG. 1C) is asserted, (c) the memory column address terms loaded into the column address registers 184a and 184b match newly incoming memory column address terms, and (d) the COL bit of the control register 181 is asserted. Otherwise, the output of the AND gate 195 is low. The output of the AND gate 195 is fed into a first input of a multiplexer 197 of the logic circuitry 190 that is discussed in greater detail below.

The OR gate 196 of the logic circuitry 190 produces the logical summation or logical disjunction of the output of the AND gate 189 of the first branch 141 and the output of the AND gate 193 of the second branch 142. Thus, the output of the OR gate 196 is high (a) when the memory row address terms loaded into the row address registers 182a-182c match newly incoming memory row address terms, and the ROW bit of the control register 181 (FIG. 1C) is asserted, and/or (b) when the memory column address terms loaded into the column address registers 184a and 184b match newly incoming memory column address terms, and the COL bit of the control register 181 is asserted. Otherwise, the output of the OR gate 196 is low. The output of the OR gate 196 is fed into a second input of the multiplexer 197 of the logic circuitry 190.

The multiplexer 197 (a) receives the output of the AND gate 195 and the output of the OR gate 196 as inputs and (b) outputs either the output of the AND gate 195 or the output of the OR gate 196 as a FORCE_FAIL signal depending on whether the BIT bit of the control register 181 is asserted. In particular, when the BIT bit of the control register 181 is not asserted, the multiplexer 197 outputs the output of the OR gate 196. When the BIT bit of the control register 181 is asserted, the multiplexer 197 outputs the output of the AND gate 195. As discussed in greater detail below with respect to FIG. 1E, the FORCE_FAIL signal, when asserted, enables data bits corresponding to the memory row address terms in the row address registers 182a-182c and/or to the memory column address terms in the column address registers 184a and 184b to be poisoned. Thus, the first branch 141 and the second branch 142 of the logic circuitry 190 enable the circuitry 180 to poison data bits only when (a) the output of the AND gate 195 is high and the BIT bit of the control register 181 is asserted, or (b) the output of the OR gate 196 is high and the BIT bit is unasserted. In other words, the circuitry 180 poisons data bits read from the memory array 150 (FIG. 1B) of the memory device 100 only when (a) the BIT bit is asserted, the memory row address terms loaded into the row address registers 182a-182c match newly incoming memory row address terms, the ROW bit of the control register 181 is asserted, the memory column address terms loaded into the column address registers 184a and 184b match newly incoming memory column address terms, and the COL bit of the control register 181 is asserted; (b) the BIT bit is unasserted, the memory row address terms loaded into the row address registers 182a-182c match newly incoming memory row address terms, and the ROW bit of the control register 181 is asserted; (c) the BIT bit is unasserted, the memory column address terms loaded into the column address registers 184a and 184b match newly incoming memory column address terms, and the COL bit of the control register 181 is asserted; and/or (d) the BIT bit is unasserted, the memory row address terms loaded into the row address registers 182a-182c match newly incoming memory row address terms, the ROW bit of the control register 181 is asserted, the memory column address terms loaded into the column address registers 184a and 184b match newly incoming memory column address terms, and the COL bit of the control register 181 is asserted.

Referring now to the third branch 143 of the logic circuitry 190, the third branch 143 includes the I/O register 186, the AND gate 191, and data input latches 194. As I/O and/or burst bit terms are serially received over DQ terminals of the memory device 100, the input latches 194 for each DQ pin parallelizes the I/O and/or burst bit terms and passes them to the I/O register 186. The I/O and/or burst bit terms are then clocked into the I/O register 186 via the output of the AND gate 191 when the PGM bit of the control register 181 is asserted and the memory device 100 receives an WR or WR-AP command. In turn, the I/O and/or burst bit terms loaded into the I/O register 186 are fed to datapath poison control logic circuitry (FIG. 1E) of the memory device 100 as IO_FAIL signals that are used to select on which internal DRW lines of the memory device 100 to poison data bits.

In embodiments in which MRW commands are used to program registers with memory column address terms, memory column mask address terms, and/or DQ terms, the third branch 143 of the logic circuitry 190 can include additional registers than shown in FIG. 1D. For example, the third branch 143 can include an additional set of registers (not shown) that can be programed with a combination of (a) various memory column address terms (e.g., CA[2:0] or burst bit terms) from the column address registers 184a and 184b, (b) various memory column mask address terms (e.g., CA[2:0] or burst bit terms) from the column address mask registers 185a and 185b, and/or (c) DQ terms from the I/O register 186. Terms loaded into the additional set of registers can be used to force specific data write (DW) bits on the output of the input latches 194 in FIG. 1D.

Figure 1E:
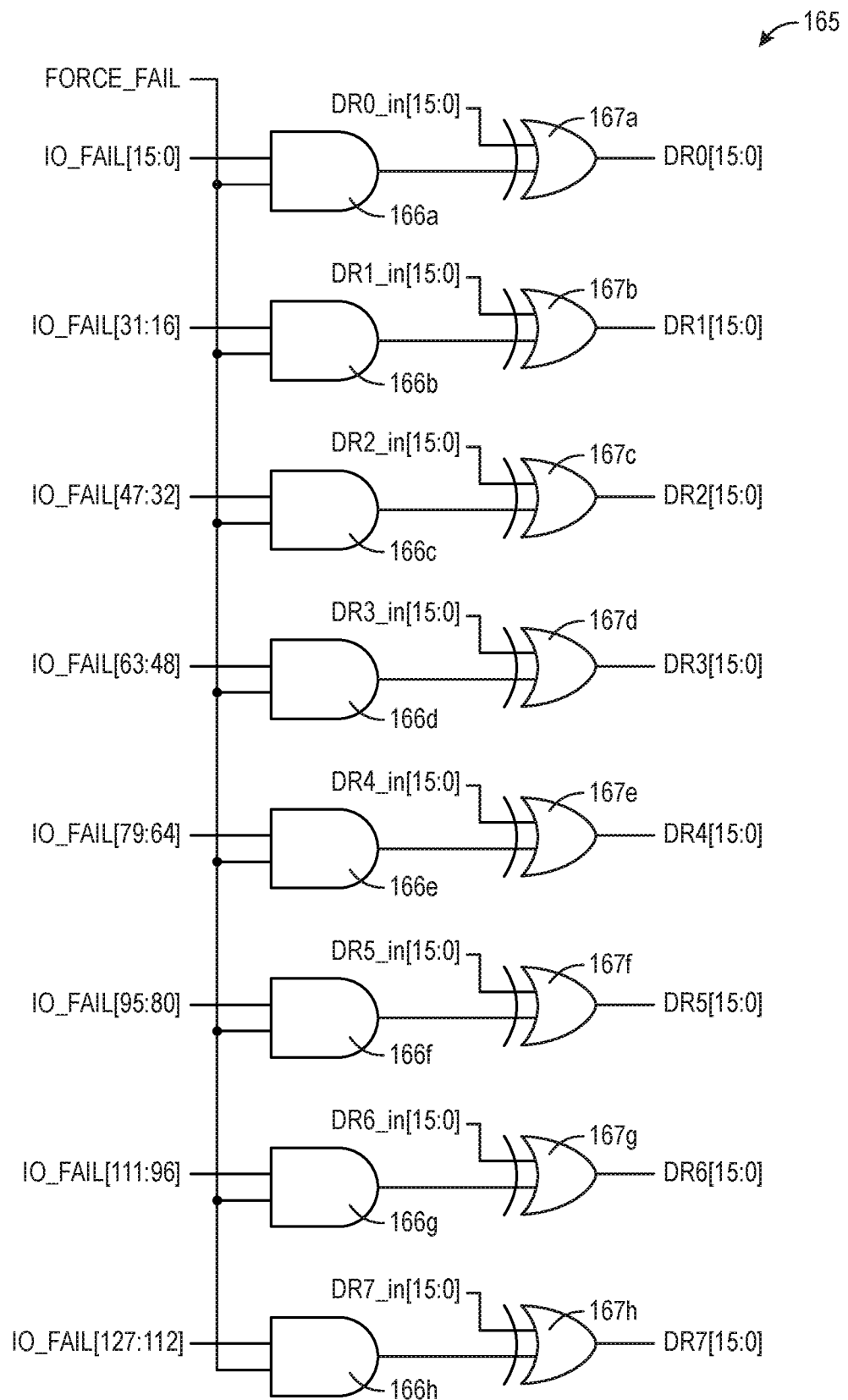
FIG. 1E is a partially schematic representation of datapath poison control logic circuitry of address-selectable data poisoning circuitry configured in accordance with various embodiments of the present technology.

FIG. 1E is a partially schematic representation of datapath poison control logic circuitry 165 ("datapath poison control circuitry 165") of the circuitry 180 and configured in accordance with various embodiments of the present technology. As shown the datapath poison control circuitry 165 includes a plurality of AND gates 166 (identified individually as AND gates 166a-166h in FIG. 1E) and a plurality of XOR gates 167 (identified individually as XOR gates 167a-167h). More specifically, the datapath poison control circuitry 165 includes an AND gate 166 and an XOR gate 167 per DQ terminal DQ0-DQ7 of the memory device 100.

Each of the AND gates 166a-166h is configured to receive the FORCE_FAIL signal output from the multiplexer 197 of the logic circuitry 190 (FIG. 1D) and a corresponding IO_FAIL signal output from the I/O register 186 (FIG. 1D). In turn, each of the AND gates 166a-166h is configured to produce the logical product or logical conjunction of the FORCE_FAIL and the corresponding IO_FAIL signal. Thus, an output of one of the AND gates 166a-166h is high only when (a) the FORCE_FAIL signal is high (indicating that a read operation of the memory device 100 is targeting a memory row, a memory column, and/or a memory bit of interest identified in the control register 181, the row address registers 182a-182c, the column address registers 184a and 184b, the row address mask registers 183a-183c, and/or the column address mask registers 185a and 185b) and (b) the corresponding IO_FAIL signal is high (indicating that that the corresponding portion of the read datapath or the corresponding DQ terminal has been enabled for data poisoning). Otherwise, the output of the one of the AND gates 166a-166h is low.

Each of the XOR gates 167a-167h is configured to receive (a) the output of a corresponding one of the AND gates 166a-166h and (b) data bits read from the memory array 150 of the memory device 100 over internal DRW lines of the memory device 100. The XOR gates 167a-167h are each configured to produce the exclusive disjunction of its inputs. Thus, each of the XOR gates 167a-167h is configured to poison a data bit received over corresponding internal DRW lines when the output of the corresponding one of the AND gates 166a-166h is high (indicating that (a) the data bit read from the memory array 150 over the corresponding internal DRW lines corresponds to a targeted memory row, a targeted memory column, and/or a targeted memory cell identified by the terms loaded into the registers 181-185b of the circuitry 180, and (b) the corresponding internal DRW lines/DQ terminal of the memory device 100 is enabled for data poisoning by the terms loaded into the I/O register 186).

Otherwise, each of the XOR gates 167a-167h is configured to pass the data bit without poisoning the data bit (indicating that (a) the data bit read from the memory array 150 over the corresponding internal DRW lines does not correspond to a targeted memory row, a targeted memory column, and/or a targeted memory cell identified by the terms loaded into the registers 181-185b of the circuitry 180, and/or (b) the corresponding internal DRW lines/DQ terminals are not enabled for data poisoning by the terms loaded into the I/O register 186). The data bits output from the XOR gates 167a-167h are then passed to the I/O circuit 160 and/or read out of corresponding DQ terminals DQ0-DQ7 of the memory device 100.

Figure 2:
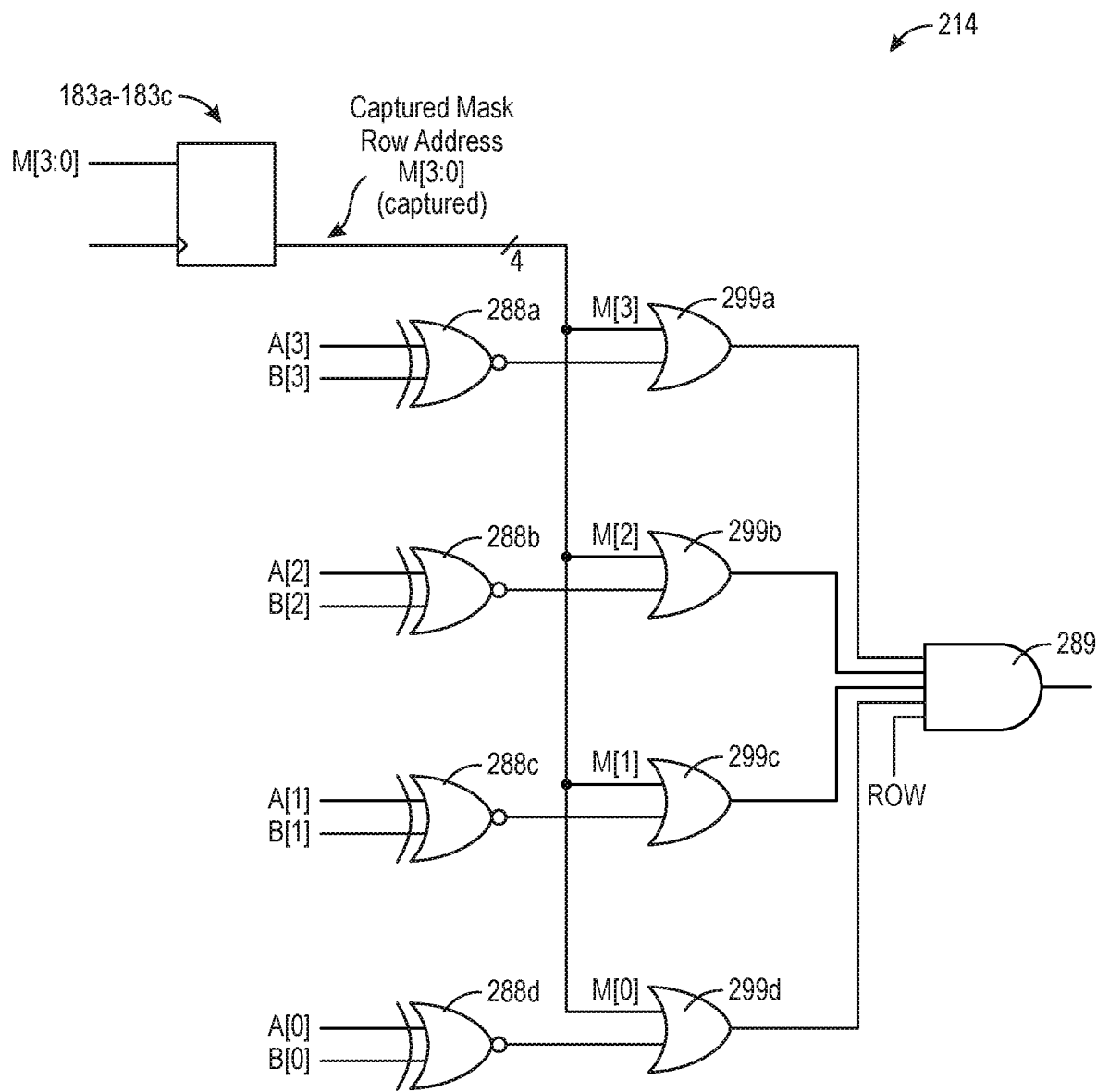
FIG. 2 is a partially schematic representation of masking circuitry of address-selectable data poisoning circuitry configured in accordance with various embodiments of the present technology.

As discussed above, the circuitry 180 can include row address mask registers 183a-183c and/or column address mask registers 185a and 185b to define a range of memory rows and/or a range of memory columns, respectively, for poisoning data bits. In these embodiments, additional masking circuitry can be added to the logic circuitry 190 of FIG. 1D at location 114 and/or location 116 of FIG. 1D. One example of masking circuitry 214 is illustrated in FIG. 2. For the sake of clarity and understanding, the masking circuitry 214 (a) compares two 4-bit memory row address terms A[3:0] and B[3:0] and (b) masks the result of the comparison using 4-bit memory row address terms M[3:0] loaded into the row address mask registers 183a-183c of the circuitry 180 (FIGS. 1B and 1C). The logic illustrated in FIG. 2 can be extended for any number of bits of memory row address terms.

As shown in FIG. 2, the masking circuitry 214 includes a plurality of XNOR gates 288 (identified individually as XNOR gates 288a-288d in FIG. 2). The XNOR gates 288a-288d function similar to the XNOR gate 188 of FIG. 1D discussed above. In particular, the XNOR gates 288a-288d determine whether bits B[3:0] of memory row address terms loaded into the row address registers 182a-182c (FIGS. 1C and 1D) match corresponding bits A[3:0] of newly incoming memory row address terms during a read operation of the memory device 100. When bits match, the output of the corresponding XNOR gate 288 is high. Otherwise, the output of the corresponding XNOR gate 288 is low.

The outputs of the XNOR gates 288a-288d are then fed into corresponding OR gates 299 (identified individually as OR gates 299a-299d in FIG. 2). The OR gates 299a-299d produce the logical summation or logical disjunction of the outputs of the XNOR gates 288a-288d and corresponding bits M[3:0] of memory row address terms loaded into the row address mask registers 183a-183c. Thus, the outputs of the OR gates 299a-299d are high when (a) the corresponding bits B[3:0] of the memory row address terms loaded into the row address registers 182a-182c of the circuitry 180 match corresponding bits A[3:0] of newly incoming memory row address terms, and/or (b) the corresponding bits M[3:0] of the memory row address terms loaded into the row address mask registers 183a-183c are "high." The outputs of the OR gates 299a-299d are then fed into the AND gate 289, which functions similar to the AND gate 189 of FIG. 1D discussed above.

In this manner, the memory row address terms loaded into the row address registers 182a-182c and the memory row address terms loaded into the row address mask registers 183a-183c can be used to define a range of targeted memory rows for data poisoning. For example, when memory row address terms B[3:0] loaded into the row address registers 182a-182c are "1000" and memory row address terms M[3:0] loaded into the row address mask registers 183a-

183c are "1011," then all newly incoming memory row address terms A[3:0] that fall within "1000" and "1011" will cause the output of the AND gate 289 to be "high" (assuming that the ROW bit of the control register 181 is asserted). All other newly incoming memory row address terms A[3:0] (e.g., "1100") that fall outside of this range will cause the output of the AND gate 289 to be "low."

Similar logic as shown in FIG. 2 can be used at location 116 of FIG. 1D to define a range of memory column addresses for poisoning. For example, the row address mask registers 183a-183c illustrated in FIG. 2 can be replaced with the column address mask registers 185a and 185b, and the COL bit of the control register 181 (FIG. 1C) can be input into the AND gate 289 of FIG. 2 in lieu of the ROW bit of the control register 181. Memory column address terms B[3:0] loaded into the column address registers 184a and 184b can then be compared to newly incoming column address terms A[3:0], and the result can be masked using memory column address terms M[3:0] loaded into the column address mask registers 185a and 185b.

As discussed above, the circuitry 180 can use various methods to determine when to load memory row address terms into the row address mask registers 183a-183c (e.g., as opposed to into the row address registers 182a-182c) and/or when to load memory column address terms into the column address mask registers 185a and 185b (e.g., as opposed to into the column address registers 184a and 184b). For example, the circuitry 180 can load memory row address terms into the row address registers 182a-182c when the PGM bit of the control register 181 (FIG. 1C) is asserted and a mask bit (not shown) of the control register 181 is not asserted. Continuing with this example, the circuitry 180 can load memory row address terms into the row address mask registers 183a-183c when a mask bit (not shown) of the control register 181 is asserted. The PGM bit and the mask bit can be similarly used to load memory column address terms into the column address registers 184a and 184b and/or into the column address mask registers 185a and 185b.

As another example, the circuitry 180 can sequentially load memory row address terms into the row address registers 182a-182c and the row address mask registers 183a-183c, alternatively between the row address registers 182a-182c and the row address mask registers 183a-183c each time an ACT command is received while the PGM bit of the control register 181 is asserted. More specifically, the circuitry 180 can (a) load memory row address terms into the row address registers 182a-182c when the circuitry 180 receives a first ACT command while the PGM bit of the control register 181 is asserted; (b) load memory row address terms into the row address mask registers 183a-183c when the circuitry 180 receives a second ACT command while the PGM bit of the control register 181 is asserted; (c) load memory row address terms into the row address registers 182a-182c when the circuitry 180 received a third ACT command while the PGM bit of the control register 181 is asserted; and (d) so on. A counter (e.g., a one-bit counter) can be used to count the ACT commands and/or determine whether to load the row address registers 182a-182c or the row address mask registers 183a-183c. The registers 182a-183c can be reset at any time by asserting the RST bit of the control register 181. A similar method can be employed to load memory column address terms into the column address registers 184a and 184b and/or into the column address mask registers 185a and 185b.

Similar to the above example, the circuitry 180 in some embodiments can sequentially load memory row address terms into the row address registers 182a-182c and the row address mask registers 183a-183c, alternatively between the row address registers 182a-182c and the row address mask registers 183a-183c each time an ACT command is received while the PGM bit of the control register 181 is asserted. In contrast to the above example, however, the circuitry 180 can clear or reset the row address mask registers 183a-183c each time the circuitry 180 loads memory row address terms into the row address registers 182a-182c. A similar method can be employed to load memory column address terms into the column address registers 184a and 184b and/or into the column address mask registers 185a and 185b.

As still another example, the circuitry 180 can use a one-bit counter to sequentially load memory row address terms into the row address registers 182a-182c and thereby define memory row address terms loaded into the row address mask registers 183a-183c. More specifically, when the circuitry 180 receives a first ACT command while the PGM bit of the control register 181 is asserted, the circuitry 180 can (a) load memory row address terms into the row address registers 182a-182c, (b) feed the memory row address terms into a first input of an XOR gate (not shown), and (c) clear or reset memory row address terms loaded into the row address mask registers 183a-183c. When the circuitry 180 subsequently receives a second ACT command while the PGM bit of the control register 181 is asserted, the circuitry 180 can (a) load newly incoming memory row address terms into the row address registers 182a-182c, (b) feed the newly incoming memory row address terms into a second input of the XOR gate, and (c) load the output of the XOR gate into the row address mask registers 183a-183c. A similar method can be employed to load memory column address terms into the column address registers 184a and 184b and/or into the column address mask registers 185a and 185b.

Although discussed above in the context of poisoning data bits read from the memory array 150 of the memory device, the circuitry 180 can be employed to poison data bits as they are written to the memory array 150 of the memory device 100. For example, as data bits are received over the DQ terminals of the memory device 100, the circuitry 180 can poison select data bits before those data bits are written to the memory array 150. The poisoning can occur before or after the ECC circuit 157 of the memory device 100 encodes the data bits during the write operation. In the event that the poisoning occurs before the ECC circuit 157 of the memory device 100 processes or encodes the data bits during the write operation, the poisoning can be used to test and/or determine whether ECC operations properly identify and/or correct the resulting bit errors before the data bits are stored to the memory array 150. In the event that the poisoning occurs after the ECC circuit 157 of the memory device 100 processes or encodes the data bits during the write operation, the data bits can be stored to the memory array 150 as bit errors. In these embodiments, the bit errors stored to the memory array 150 can be used to test and/or determine whether ECC operations (or other operations of the memory device 100, such as PPR operations) properly identify and/or correct the resulting bit errors when the data bits are subsequently read from the memory array 150.

Figure 3:
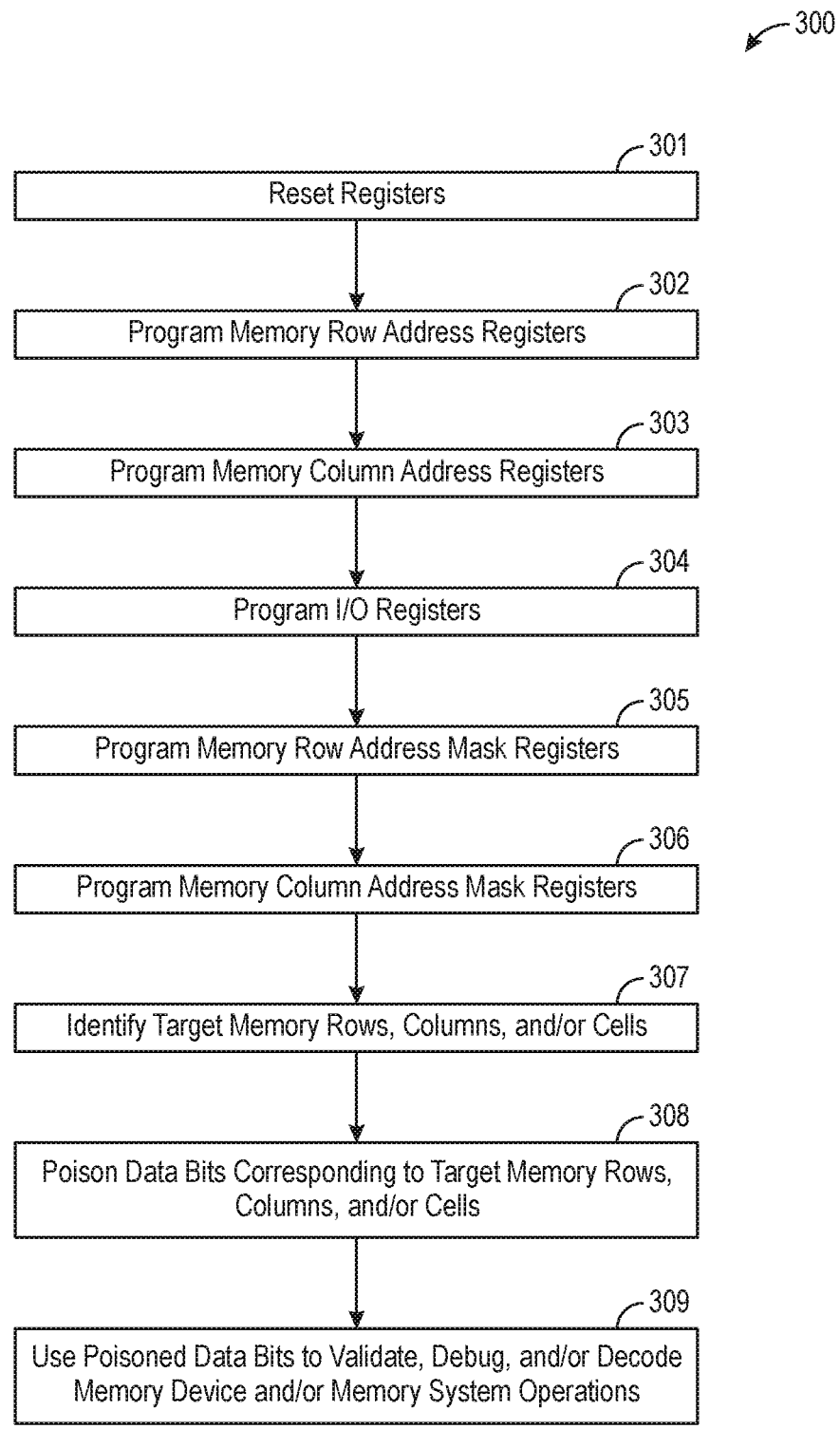
FIG. 3 is a flow diagram illustrating a method of operating address-selectable data poisoning circuitry in accordance with various embodiments of the present technology.

FIG. 3 is a flow diagram illustrating a method 300 of operating address-selectable data poisoning circuitry (e.g., the circuitry 180 of FIGS. 1B-2) in accordance with various embodiments of the present technology. The method 300 is illustrated as a set of steps or blocks 301-309. All or a subset of one or more of the blocks 301-309 can be executed by components or devices of a memory system, such as the memory system 102 of FIG. 1A. For example, all or a subset of one or more of the blocks 301-309 can be executed by (i) a memory device (e.g., a memory device 100 of FIGS. 1A and 1B), (ii) a memory controller (e.g., the memory controller 101 of FIG. 1A), and/or (iii) a host device (e.g., the host device 108 of FIG. 1A). Furthermore, any one or more of the blocks 301-309 can be executed in accordance with the discussion of FIGS. 1A-2 above.

The method 300 begins at block 301 by resetting various registers of the address-selectable data poisoning circuitry. In some embodiments, resetting the registers can include resetting memory row address registers, memory row address mask registers, memory column address registers, memory column address mask registers, and/or I/O registers. In these and other embodiments, resetting the registers can include asserting a RST bit of a control register of the address-selectable data poisoning circuitry. In these and still other embodiments, resetting the registers can include (a) asserting an EN bit of the control register and/or (b) unasserting the RST bit of the control register after the various registers have been reset.

At block 302, the method 300 continues by programming the memory row address registers of the address-selectable data poisoning circuitry. In some embodiments, programming the memory row address registers includes (a) asserting a PGM bit of the control register and/or (b) programming the memory row address registers while the PGM bit is asserted. In these and other embodiments, programming the memory row address registers includes loading memory row address terms into the memory row address registers in response to receiving (e.g., from the memory controller and/or the host device) an ACT command and/or the memory row address terms. In some embodiments, the memory row address terms loaded into the memory row address registers can include memory row address terms output from a row decoder of the memory device, or memory row address terms fed into the row decoder. The memory row address terms loaded into the memory row address registers can identify a target memory row for data poisoning.

At block 303, the method 300 continues by programming the memory column address registers of the address-selectable data poisoning circuitry. In some embodiments, programming the memory column address registers includes (a) asserting a PGM bit of the control register and/or (b) programming the memory column address registers while the PGM bit is asserted. In these and other embodiments, programming the memory column address registers includes loading memory column address terms into the memory column address registers in response to receiving (e.g., from the memory controller and/or the host device) a WR or WR-AP command and/or the memory column address terms. In some embodiments, the memory column address terms loaded into the memory column address registers can include memory column address terms output from a column decoder of the memory device, or memory column address terms fed into the column decoder. The memory column address terms loaded into the memory column address registers can identify a target memory column for data poisoning.

At block 304, the method 300 continues by programming the I/O register of the address-selectable data poisoning circuitry. In some embodiments, programming the I/O register includes (a) asserting a PGM bit of the control register and/or (b) programming the I/O register while the PGM bit is asserted. In these and other embodiments, programming the I/O register includes loading I/O terms into the I/O register in response to receiving (e.g., from the memory controller and/or the host device) a WR or WR-AP command and/or the I/O terms. In some embodiments, the I/O terms loaded into the I/O register can include I/O terms received over the DQ bus operably connecting the memory device to the memory controller and/or to the host device. The I/O terms loaded into the I/O register can identify portions of datapaths (e.g., DRW lines) internal the memory device and/or DQ terminals enabled for data poisoning.

At block 305, the method 300 continues by programming memory row address mask registers of the address-selectable data poisoning circuitry. In some embodiments, programming the memory row address mask registers includes (a) asserting a PGM bit and/or one or more other bits (e.g., a mask bit) of the control register and/or (b) programming the memory row address registers while the PGM bit and/or the one or more other bits are asserted. In these and other embodiments, programming the memory row address mask registers includes loading memory row address terms into the memory row address mask registers in response to receiving (e.g., from the memory controller and/or the host device) an ACT command and/or the memory row address terms. The ACT command can be an ACT command received before or after the ACT command of block 302. In some embodiments, the memory row address terms loaded into the memory row address mask registers can include memory row address terms output from the row decoder of the memory device, or memory row address terms fed into the row decoder. The memory row address terms loaded into the memory row address mask registers can be used to identify a target range memory rows for data poisoning.

At block 306, the method 300 continues by programming memory column address mask registers of the address-selectable data poisoning circuitry. In some embodiments, programming the memory column address mask registers includes (a) asserting a PGM bit and/or one or more other bits (e.g., a mask bit) of the control register and/or (b) programming the memory row address registers while the PGM bit and/or the one or more other bits are asserted. In these and other embodiments, programming the memory column address mask registers includes loading memory column address terms into the memory column address mask registers in response to receiving (e.g., from the memory controller and/or the host device) a WR or WR-AP command and/or the memory column address terms. The WR or WR-AP command can be a WR or WR-AP command received before or after the WR or WR-AP command of block 303. In some embodiments, the memory column address terms loaded into the memory column address mask registers can include memory column address terms output from the column decoder of the memory device, or memory column address terms fed into the column decoder. The memory column address terms loaded into the memory column address mask registers can be used to identify a target range memory column for data poisoning.

At block 307, the method 300 continues by identifying target memory rows, target memory columns, and/or target memory cells for data poisoning. In some embodiments, identifying one or more target memory rows includes asserting a ROW bit of the control register. In these and other embodiments, identifying one or more target memory columns includes asserting a COL bit of the control register. In these and still other embodiments, identifying one or more select memory cells corresponding to the target memory row(s) and to the target memory column(s) includes asserting a BIT bit of the control register.

At block 308, the method 300 continues by poisoning data bits corresponding to target memory rows, target memory columns, and/or target memory cells. In some embodiments, poisoning data bits corresponding to target memory rows includes determining, at least when the ROW bit of the control register is asserted, that newly incoming memory row address terms (a) match memory row address terms loaded into the memory row address registers at block 302, and/or (b) are included within a range of target memory row address terms identified by the memory row address terms loaded into the memory row address registers at block 302 and the memory row address terms loaded into the memory row address mask registers at block 305. In these and other embodiments, poisoning data bits corresponding to target memory columns includes determining, at least when the COL bit of the control register is asserted, that newly incoming memory column address terms (a) match memory column address terms loaded into the memory column address registers at block 303, and/or (b) are included within a range of target memory column address terms identified by the memory column address terms loaded into the memory column address registers at block 303 and the memory column address terms loaded into the memory column address mask registers at block 306. In these and still other embodiments, poisoning data bits corresponding to target memory cells includes determining, at least when the ROW bit, the COL bit, and the BIT bit of the control register are asserted, (a) that newly incoming memory row address terms (i) match memory row address terms loaded into the memory row address registers at block 302 and/or (ii) are included within a range of target memory row address terms identified by the memory row address terms loaded into the memory row address registers at block 302 and the memory row address terms loaded into the memory row address mask registers at block 305, and (b) that newly incoming memory column address terms (i) match memory column address terms loaded into the memory column address registers at block 303 and/or (ii) are included within a range of target memory column address terms identified by the memory column address terms loaded into the memory column address registers at block 303 and the memory column address terms loaded into the memory column address mask registers at block 306.

In some embodiments, poisoning data bits corresponding to target memory rows, target memory columns, and/or target memory cells includes poisoning the data bits while the data bit are read from a memory array of the memory device. In these and other embodiments, poisoning data bits corresponding to target memory rows, target memory columns, and/or target memory cells includes poisoning data bits read out on internal DRW lines of the memory device that are enabled for data poisoning by the I/O register. In these and still other embodiments, poisoning data bits corresponding to target memory rows, target memory columns, and/or target memory cells includes inverting the data bits (a) before or after the data bits are processed by an ECC circuit of the memory device, and/or (b) before the data bits are read out of DQ terminals of the memory device.

At block 309, the method 300 continues by using the poisoned data bits to validate, debug, and/or decode various operations of the memory device and/or the memory system. In some embodiments, the poisoned data bits are used to validate and/or debug ECC operations of the memory device. For example, the data bits can be poisoned at block 308 before the data bits are processed by an ECC circuit of the memory device such that the ECC circuit receives one or more poisoned data bits. In turn, the poisoned data bits can be used to verify that ECC operations properly identify and/or correct one or more bit errors corresponding to the poisoned data bits. In these and other embodiments, the poisoned data bits can be used to validate and/or debug ECC operations of the memory system (as opposed to ECC operations of the memory device). For example, the data bits can be poisoned at block 308 after the data bits are processed by an ECC circuit of the memory device but before the data bits are processed by ECC components of the memory system (e.g., located on the memory controller) such that the ECC components of the memory system receive one or more poisoned data bits. In turn, the poisoned data bits can be used to verify that the ECC components of the memory system properly identify and/or correct one or more bit errors corresponding to the poisoned data bits. In these and still other embodiments, the poisoned data bits can be used to validate and/or debug PPR operations of the memory device and/or of the memory system. For example, the data bits can be used to trigger a PPR operation of the memory device and/or of the memory system, and/or to verify that a redundant memory row of the memory array has been successfully used to replace a defective memory row of the memory array. In these and other embodiments, the poisoned data bits can be used to decode memory address scrambles and/or DQ scrambles of the memory system (e.g., by hardcoding one or more of the registers of the address-selectable data poisoning circuitry using MRW commands, monitoring outputs of the memory device, and using the outputs to decode address and/or DQ scrambles between the logical structure of addresses and/or data as seen by a user from outside of the memory device and the physical or topographical internal structure of addresses and/or data within the memory device).

Although the blocks 301-309 of the method 300 are discussed and illustrated in a particular order, the method 300 illustrated in FIG. 3 is not so limited. In other embodiments, the method 300 can be performed in a different order. In these and other embodiments, any of the block 301-309 of the method 300 can be performed before, during, and/or after any of the other blocks 301-309 of the method 300. Moreover, a person of ordinary skill in the relevant art will recognize that the illustrated method 300 can be altered and still remain within these and other embodiments of the present technology. For example, one or more blocks 301-309 of the method 300 illustrated in FIG. 3 can be omitted and/or repeated in some embodiments. As a specific example, blocks 304, 305, and/or 306 can be omitted in some embodiments.

Figure 4:
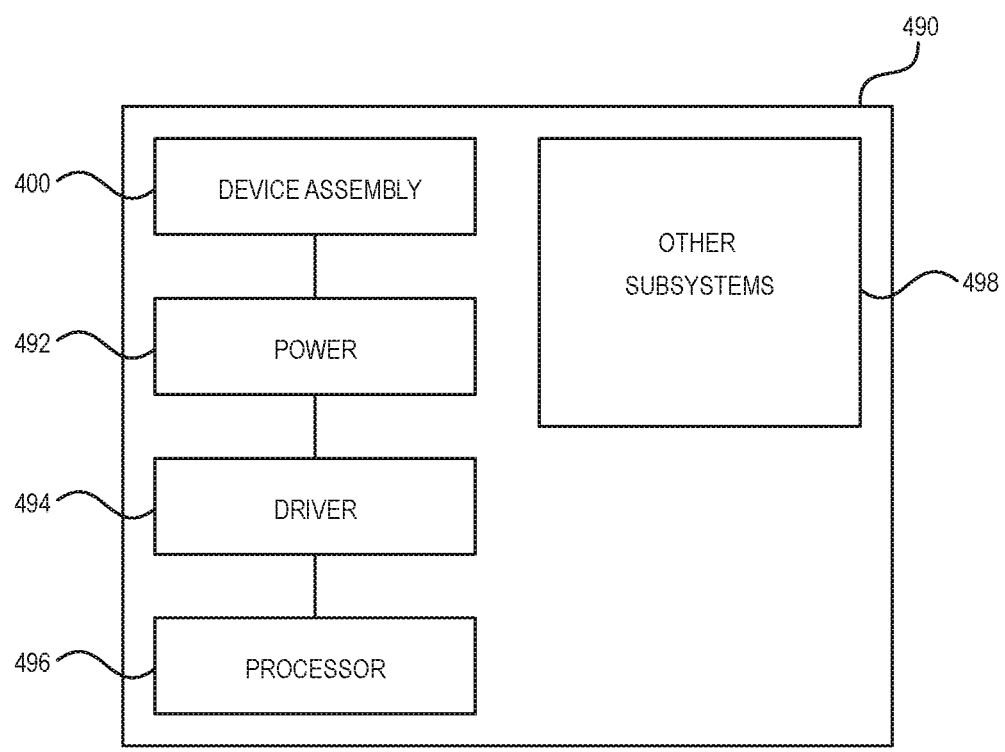
FIG. 4 is a schematic view of a system that includes a memory device or system configured in accordance with various embodiments of the present technology.

Any of the foregoing memory systems, devices, and/or methods described above with reference to FIGS. 1A-3 can be incorporated into any of a myriad of larger and/or more complex systems, a representative example of which is system 490 shown schematically in FIG. 4. The system 490 can include a semiconductor device assembly 400, a power source 492, a driver 494, a processor 496, and/or other subsystems and components 498. The semiconductor device assembly 400 can include features generally similar to those of the memory systems, devices, and/or methods described above with reference to FIGS. 1A-3. The resulting system 490 can perform any of a wide variety of functions, such as memory storage, data processing, and/or other suitable functions. Accordingly, representative systems 490 can include, without limitation, hand-held devices (e.g., mobile phones, tablets, digital readers, and digital audio players), computers, vehicles, appliances, and other products. Components of the system 490 may be housed in a single unit or distributed over multiple, interconnected units (e.g., through a communications network). The components of the system 490 can also include remote devices and any of a wide variety of computer readable media.

C. Conclusion

As used herein, the terms "memory system" and "memory device" refer to systems and devices configured to temporarily and/or permanently store information related to various electronic devices. Accordingly, the term "memory device" can refer to a single memory die and/or to a memory package containing one or more memory dies. Similarly, the term "memory system" can refer to a system including one or more memory dies (e.g., a memory package) and/or to a system (e.g., a dual in-line memory module (DIMM)) including one or more memory packages.

Where the context permits, singular or plural terms can also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having" and "with" are used throughout to mean including at least the recited feature(s) such that any greater number of the same feature and/or additional types of other features are not precluded. Moreover, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented and/or discussed in a given order, alternative embodiments can perform steps in a different order. Furthermore, the various embodiments described herein can also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. From the foregoing, it will also be appreciated that various modifications can be made without deviating from the technology. For example, various components of the technology can be further divided into subcomponents, or that various components and functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A memory device, comprising:
    a memory array having a plurality of memory rows and a plurality of memory columns; and
    circuitry operably coupled to the memory array,
    wherein the circuitry includes (a) one or more memory row address registers or (b) one or more memory column address registers,
    wherein the circuitry is configured to load a memory row address corresponding to a memory row of the plurality of memory rows into the one or more memory row address registers or to load a memory column address corresponding to a memory column of the plurality of memory columns into the one or more memory column address registers, and
    wherein the circuitry is further configured, during a read or write operation directed to (i) the memory row address loaded into the one or more memory row address registers or (ii) the memory column address loaded into the one or more memory column address registers, to change a first data state of a data bit stored in the memory array and corresponding to the memory row address or to the memory column address to a second data state different from the first data state before the data bit is output from the memory device as part of the read operation or before the data bit is stored to the memory array as part of the write operation.

2. The memory device of claim 1, wherein the circuitry is configured to change the first data state to the second data state such that the data bit is output from the memory device as a bit error.

3. The memory device of claim 2, wherein:
    the memory device further includes an error correction code (ECC) circuit; and
    the circuitry is configured to change the first data state to the second data state after the ECC circuit processes the data bit.

4. The memory device of claim 2, wherein:
    the memory device further includes an error correction code (ECC) circuit; and
    the circuitry is configured to change the first data state to the second data state before the ECC circuit processes the data bit.

5. The memory device of claim 1, wherein:
    the memory device further comprises a row decoder; and the circuitry is configured to receive the memory row address from the row decoder.

6. The memory device of claim 1, wherein the circuitry is further configured to (a) load the memory row address into the one or more memory row address registers when the memory device receives an activate command, or (b) load the memory column address into the one or more memory column address registers when the memory device receives a write command or a write-autoprecharge command.

7. The memory device of claim 6, wherein:
the activate command, the write command, or the write-autoprecharge command are part of a first set of access commands; and
the memory device is configured to execute the read or write operation in response to a second set of access commands different from the first set.

8. The memory device of claim 1, wherein the circuitry is further configured to (a) load the memory row address into the one or more memory row address registers when the memory device receives a first mode register write command, or (b) load the memory column address into the one or more memory column address registers when the memory device receives a second mode register write command.

9. The memory device of claim 1, wherein:
the memory row address is a first memory row address, the memory row is a first memory row, the memory column address is a first memory column address, and the memory column is a first memory column;
the read or write operation is directed to (a) a second memory row address corresponding to a second memory row of the plurality of memory rows, or (b) a second memory column address corresponding to a second memory column of the plurality of memory columns; and
the circuitry is further configured to:
compare (a) the first memory row address to the second memory row address or (b) the first memory column address to the second memory column address, and
change the first data state of the data bit to the second data state only when (a) the first memory row address matches the second memory row address, (b) the first memory column address matches the second memory column address, or (c) the first memory row address matches the second memory row address and the first memory column address matches the second memory column address.

10. The memory device of claim 1, wherein:
the memory row address is a first memory row address, the memory row is a first memory row, the memory column address is a first memory column address, and the memory column is a first memory column; and
the circuitry further includes (a) one or more memory row address mask registers configured to store a second memory row address corresponding to a second memory row of the plurality of memory rows, or (b) one or more memory column address mask registers configured to store a second memory column address corresponding to a second memory column of the plurality of memory columns.

11. The memory device of claim 10, wherein:
the first memory row address and the second memory row address identify a range of memory row addresses corresponding to a range of memory rows of the plurality of memory rows, or the first memory column address and the second memory column address identify a range of memory column addresses corresponding to a range of memory columns of the plurality of memory columns; and
the read or write operation is directed to (a) a third memory row address corresponding to a third memory row of the plurality of memory rows, or (b) a third memory column address corresponding to a third memory column of the plurality of memory columns; and
the circuitry is further configured to:
compare (a) the third memory row address to the range of memory row addresses or (b) the third memory column address to the range of memory column addresses, and
change the first data state of the data bit to the second data state only when (a) the third memory row address falls within the range of memory row addresses, (b) the third memory column address falls within the range of memory column addresses, or (c) the third memory row address falls within the range of memory row addresses and the third memory column address falls within the range of memory column addresses.

12. The memory device of claim 1, wherein:
the memory device includes an external DQ terminal;
the circuitry includes an input/output (I/O) register having at least one bit corresponding to the external DQ terminal;
the memory device is configured to output the data bit from the memory device via the external DQ terminal; and
the circuitry is configured to change the first data state of the data bit to the second data state only when the at least one bit of the I/O register is asserted.

13. A method, comprising:
identifying at least one memory row or at least one memory column of a memory array of a memory device for data poisoning;
executing a read or write operation directed to a memory row address of a first memory row and to a memory column address of a first memory column;
determining that the memory row address corresponds to a memory row of the at least one memory row or that the memory column address corresponds to a memory column of the at least one memory column; and
in response to the determination and while executing the read or write operation, changing a first data state of a data bit read out from or written to the memory array to a second data state before the data bit is output from the memory device as part of the read operation or before the data bit is stored to the memory array as part of the write operation, wherein the second data state is different from the first data state.

14. The method of claim 13, wherein identifying the at least one memory row or the at least one memory column includes, before executing the read or write operation, loading a first memory row address or a first memory column address into one or more memory row address registers or one or more memory column address registers, respectively.

15. The method of claim 14, wherein:
loading the first memory row address into the one or more memory row address registers includes loading the first memory row address into the one or more memory row address registers in response to receiving an activate command or a first mode register write command; or loading the first memory column address into the one or more memory column address registers includes loading the first memory column address into the one or more memory column address registers in response to receiving a write command, a write-autoprecharge command, or a second mode register write command.

16. The method of claim 14, wherein identifying the at least one memory row or the at least one memory column further includes:
loading, before executing the read or write operation, a second memory row address or a second memory column address into one or more memory row address mask registers or one or more memory column address mask registers, respectively; and
masking the first memory row address with the second memory row address to identify a range of memory row addresses corresponding to the at least one memory row, or masking the first memory column address with the second memory column address to identify a range of memory column addresses corresponding to the at least one memory column.

17. The method of claim 14, wherein:
the method further comprises, while executing the read or write operation, comparing (a) the memory row address to the first memory row address or (b) the memory column address to the first memory column address; and
changing the first data state of the data bit to the second data state includes changing the first data state of the data bit to the second data state only when (1) the memory row address matches the first memory row address or is included within a range of memory row addresses identified at least in part by the first memory row address, (2) the memory column address matches the first memory column address or is included within a range of memory column addresses identified at least in part by the first memory column address, or (3) the memory row address matches the first memory row address or is included within the range of memory row addresses and the memory column address matches the first memory column address or is included within the range of memory column addresses.

18. The method of claim 13, wherein:
executing the read or write operation includes executing the read operation;
executing the read operation includes outputting the data bit from the memory device via an external DQ terminal of the memory device;
the method further comprises enabling the external DQ terminal for data poisoning; and
changing the first data state of the data bit to the second data state includes changing the first data state of the data bit to the second data state only when the external DQ terminal is enabled for data poisoning.

19. The method of claim 13, wherein:
the read or write operation is a first read or write operation;
changing the first data state of the data bit to the second data state includes changing the first data state of the data bit to the second data state using data poisoning circuitry of the memory device and only when the data poisoning circuitry is enabled; and
the method further comprises:
disabling the data poisoning circuitry, and
while the data poisoning circuitry is disabled, executing a second read or write operation directed to the memory row address of the first memory row or to the memory column address of the first memory column such that the data bit is (a) read from the memory array and is output from the memory device having the first data state as part of the second read operation or (b) written to the memory array having the first data state as part of the second write operation.

20. A memory system, comprising:
a memory controller; and
a memory device operably connected to the memory controller, wherein the memory device includes:
a memory array; and
circuitry operably coupled to the memory array and including (a) one or more memory row address registers or (b) one or more memory column address registers,
wherein the circuitry is configured to:
load a first memory row address or a first memory column address identified by the memory controller into the one or more memory row address registers or the one or more memory column address registers, respectively, and
while the memory device executes a read or write operation directed to a second memory row address or a second memory column address—
compare (a) the second memory row address to the first memory row address, or (b) the second memory column address to the first memory column address; and
change a first data state of a data bit read out from the memory array to a second data state different from the first data state when (i) the second memory row address matches the first memory row address or is included within a range of memory row addresses identified at least in part by the first memory row address, or (ii) the second memory column address matches the first memory column address or is included within a range of memory column addresses identified at least in part by the first memory column address, such that the data bit is output from the memory device as a first bit error as part of the read operation or is stored to the memory array as a second bit error as part of the write operation.

21. The memory system of claim 20, wherein the memory controller is configured to:
issue an activate command or a first mode register write command to load the first memory row address into the one or more memory row address registers; or
issue a write command, a write-autoprecharge command, or a second mode register write command to load the first memory column address into the one or more memory column address registers.

* * * * *